US012587327B2

(12) United States Patent     (10) Patent No.:   US 12,587,327 B2
Li et al.                                   (45) Date of Patent:     Mar. 24, 2026

(54) COOPERATIVE COMMUNICATION METHOD, APPARATUS, AND SYSTEM

(71) Applicant: HUAWEI TECHNOLOGIES CO., LTD., Shenzhen (CN)

(72) Inventors: Yunbo Li, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/662,904

(22) Filed: May 13, 2024

(65) Prior Publication Data

US 2024/0297751 A1     Sep. 5, 2024

Related U.S. Application Data

(63) Continuation of application No. 17/564,347, filed on Dec. 29, 2021, now Pat. No. 12,003,437, which is a
(Continued)

(30) Foreign Application Priority Data

Jul. 2, 2019    (CN) ......................... 201910591589.X

(51) Int. Cl.
*H04L 5/00*        (2006.01)
*H04W 72/20*      (2023.01)
(Continued)

(52) U.S. Cl.
CPC .......... *H04L 5/0035* (2013.01); *H04L 5/0053* (2013.01); *H04W 72/20* (2023.01); *H04W 80/02* (2013.01); *H04W 84/18* (2013.01)

(58) Field of Classification Search
CPC ............ H04L 27/2603; H04W 74/002; H04W 52/0216; H04W 72/1268; H04W 74/0816;
(Continued)

(56) References Cited

U.S. PATENT DOCUMENTS 10,244,555 B2 *   3/2019   Huang .............. H04W 74/0808
2015/0110046 A1    4/2015   Merlin et al.
(Continued)

FOREIGN PATENT DOCUMENTS

| CN | 106922029 A | 7/2017 |
| CN | 107113823 B | 4/2020 |
| CN | 109714092 B | * 9/2021 |

OTHER PUBLICATIONS

S5-194207, Ericsson, Addition of converged charging flows, 3GPP TSG-SA5 Meeting #0-Ad Hoc, Sapporo, Japan, Jun. 25, 2019-Jun. 28, 2019, total 7 pages.
(Continued)

*Primary Examiner* — Mahran Y Abu Roumi

(57)               ABSTRACT

A cooperative communication method receives an announcement frame from a master access point. The announcement frame includes a duration field, a value of the duration field is set to a first duration, an end time of the first duration is not later than an end time of a target trigger frame or is not later than a start time of a target trigger based (TB) physical layer protocol data unit (PPDU), the target trigger frame is a next radio frame of the announcement frame, the target TB PPDU is a response frame for the target trigger frame, the target trigger frame comprises a second trigger frame, and the target TB PPDU comprises a second TB PPDU. The slave access point sends the second trigger frame to a second station associated with the slave access point, and receives the second TB PPDU from the second station.

20 Claims, 11 Drawing Sheets

Related U.S. Application Data continuation of application No. PCT/CN2020/095459, filed on Jun. 10, 2020.

(51) Int. Cl.
| | | |
|---|---|---|
| *H04W 80/02* | (2009.01) | |
| *H04W 84/18* | (2009.01) | |

(58) Field of Classification Search
CPC ......... H04W 74/0808; H04W 52/0229; H04W 72/0446; H04W 84/12; Y02D 30/70
See application file for complete search history.

(56) References Cited

U.S. PATENT DOCUMENTS

| | | | | |
|---|---|---|---|---|
| 2017/0111924 A1* | 4/2017 | Josiam | .................. | H04L 5/0085 |
| 2017/0265221 A1* | 9/2017 | Yang | .................. | H04W 74/002 |
| 2018/0146426 A1* | 5/2018 | Park | .................... | H04L 27/2603 |
| 2018/0160459 A1* | 6/2018 | Cavalcante | ....... | H04W 52/0229 |
| 2018/0288800 A1* | 10/2018 | Yu | .................... | H04W 74/0808 |
| 2019/0037556 A1* | 1/2019 | Seok | .................... | H04L 1/0009 |
| 2019/0132762 A1* | 5/2019 | Zhu | ........................ | H04B 7/024 |
| 2022/0104071 A1* | 3/2022 | Jauh | ..................... | H04W 40/02 |

OTHER PUBLICATIONS

IEEE P802.11ax /D2.2, Feb. 2018, Draft Standard for Information technology—Telecommunications and information exchange between systems Local and metropolitan area networks—Specific requirements—Part 11: Wireless LAN Medium Access Control(MAC) and Physical Layer (PHY) Specifications, Amendment 6: Enhancements for High Efficiency WLAN. 620 pages.

* cited by examiner

FIG. 6

COOPERATIVE COMMUNICATION METHOD, APPARATUS, AND SYSTEM

CROSS-REFERENCE TO RELATED APPLICATIONS

This application is a continuation of U.S. patent application Ser. No. 17/564,347, filed on Dec. 29, 2021, which is a continuation of International Application No. PCT/CN2020/095459, filed on Jun. 10, 2020. The International Application claims priority to Chinese Patent Application No. 201910591589.X, filed on Jul. 2, 2019. All of the aforementioned patent applications are hereby incorporated by reference in their entireties.

TECHNICAL FIELD

This application relates to the field of communications technologies, and in particular, to a cooperative communication method, apparatus, and system.

BACKGROUND

Multi-link concurrent transmission in a multi-basic service set (BSS) is referred to as access point (AP) cooperation. FIG. 1 is a diagram of an existing AP cooperation procedure for uplink (UL) data transmission. After accessing a channel through contention, a master AP sends an announcement frame to a slave AP. After the slave AP receives the announcement frame, the slave AP and the master AP each send a trigger frame. The master AP sends a trigger frame 1 (hereinafter referred to as trigger 1) to a station (STA) 1 associated with the master AP, where the trigger 1 is used to trigger the STA 1 to send a trigger based (TB) physical layer protocol data unit (PPDU) 1. The slave AP sends a trigger frame 2 (hereinafter referred to as trigger 2) to a station STA 2 associated with the slave AP, where the trigger 2 is used to trigger the STA 2 to send a TB PPDU 2. Transmission of the trigger 1 and transmission of the trigger 2 end simultaneously. After a short inter-frame space (SIFS) subsequent to the end of the transmission of the trigger 1 and the transmission of the trigger 2, the STA 1 sends the TB PPDU 1 to the master AP, and the STA 2 sends the TB PPDU 2 to the slave AP. The TB PPDU 1 and the TB PPDU 2 end simultaneously. After an SIFS time subsequent to the end of the transmission of the TB PPDU 1 and the transmission of the TB PPDU 2, the master AP sends a block acknowledgment (BA 1) to the STA 1 associated with the master AP, and the slave AP sends a BA 2 to the STA 2 associated with the slave AP.

However, when the master AP in FIG. 1 sends the announcement frame to the slave AP, a basic network allocation vector (NAV) may be set for the STA 2 associated with the slave AP, and therefore the STA 2 may fail to send the TB PPDU 2 to the slave AP, which in turn causes a failure in the cooperation procedure.

SUMMARY

Embodiments of this application provide a cooperative communication method, apparatus, and system, so as to resolve a failure in a cooperation procedure in a current technology due to a possible failure of a second station associated with a slave AP in sending a second TB PPDU to the slave AP because a NAV may be set for the second station when a master AP sends an announcement frame to the slave AP.

To achieve the foregoing objective, the following technical solutions are used in the embodiments of this application.

According to a first aspect, a cooperative communication method is provided. The method includes: receiving, by a slave access point, an announcement frame from a master access point, where the announcement frame includes a duration field, a value of the duration field is set to a first duration, an end time of the first duration is not later than an end time of a target trigger frame or is not later than a start time of a target trigger based (TB) physical layer protocol data unit (PPDU), the target trigger frame is a next radio frame of the announcement frame, and the target TB PPDU is a response frame for the target trigger frame, where the target trigger frame includes a second trigger frame, and the target TB PPDU includes a second TB PPDU; sending, by the slave access point, the second trigger frame to a second station associated with the slave access point; and receiving, by the slave access point, the second TB PPDU from the second station. Based on this solution, the value of the duration field of the announcement frame is set to the first duration, the end time of the first duration is not later than the end time of the target trigger frame or is not later than the start time of the target TB PPDU, the target trigger frame may include the second trigger frame sent by the slave access point to the second station associated with the slave access point, and the target TB PPDU may include the second TB PPDU sent by the second station associated with the slave access point to the slave access point. Therefore, after the second station associated with the slave AP is triggered by the second trigger frame, a basic NAV that is set in the second station has been reduced to 0 before the transmission of the second TB PPDU. Therefore, assuming that physical carrier sensing for the second station is idle, the second station can successfully send the second TB PPDU to the associated slave access point. This resolves a failure in a cooperation procedure in a current technology due to a possible failure of the second station associated with the slave access point in sending the second TB PPDU to the slave access point because the basic NAV in the second station is currently not 0 when the second station is triggered by the second trigger frame sent by the slave access point to respond.

In a design, a value of a duration field of the second trigger frame is determined according to a preset rule. Because an indication by the master AP is not required in this method, signaling overheads can be reduced.

In an example, the preset rule includes: the value of the duration field of the second trigger frame is set to be equal to a length of time of an SIFS+a length of transmission time of the second TB PPDU+the length of time of the SIFS+a length of transmission time of a second block acknowledgment (BA)+the length of time of the SIFS+a fixed length of time, where the second BA is a response frame for the second TB PPDU. In this way, it can be ensured that the transmission of a next radio frame of the second BA is not interfered by contention initiated by another station. If the next radio frame of the second BA has a response frame or still has data to be transmitted, a TXOP time may be further extended by using a duration field of the next radio frame of the second BA. This is not limited in this embodiment of this application.

In another example, the value of the duration field of the second trigger frame is set to be equal to the length of time of the SIFS+the length of transmission time of the second TB PPDU+the length of time of the SIFS+the length of transmission time of the second BA+the length of time of the SIFS. In this way, it can be ensured that the start of the transmission of the next radio frame of the second BA is not interfered by contention initiated by another station, that is, a channel is accessed with the highest priority. If the next radio frame of the second BA has a response frame or still has data to be transmitted, the TXOP time may be further extended by using the duration field of the next radio frame of the second BA. This is not limited in this embodiment of this application.

In still another example, the value of the duration field of the second trigger frame is set to be equal to the length of time of the SIFS+the length of transmission time of the second TB PPDU+the length of time of the SIFS+the length of transmission time of the second BA. This preset rule is applicable when the second BA is the last radio frame of the current TXOP. In this way, it can be ensured that the transmission of the second BA is not interfered by contention initiated by another station.

In an embodiment, the fixed length of time is a length of transmission time of an acknowledgment (ACK) frame; or the fixed length of time is a length of transmission time of an announcement frame at the lowest rate; or the fixed length of time is a length of transmission time of an announcement frame.

In an embodiment, before the sending, by the slave access point, the second trigger frame to the second station, the method further includes: determining, by the slave access point, that a transmitter address in the announcement frame is the same as a media access control (MAC) address that is recorded by the slave access point and that is of a station that sets a basic network allocation vector (basic NAV) for the slave access point. Based on this solution, the following problem can be resolved: If a basic NAV is set for the slave AP by the announcement frame, or a basic NAV is set for the slave AP by a radio frame from the master AP earlier than the announcement frame, a value of the basic NAV is not 0, and the slave AP may not be able to send the second trigger frame.

According to a second aspect, a cooperative communication method is provided. The method includes: sending, by a master access point, an announcement frame, where the announcement frame includes a duration field, a value of the duration field is set to a first duration, an end time of the first duration is not later than an end time of a target trigger frame or is not later than a start time of a target trigger based (TB) physical layer protocol data unit (PPDU), the target trigger frame is a next radio frame of the announcement frame, and the target TB PPDU is a next radio frame of the target trigger frame, where the target trigger frame includes a first trigger frame, and the target TB PPDU includes a first TB PPDU; sending, by the master access point, the first trigger frame to a first station associated with the master access point; and receiving, by the master access point, the first TB PPDU from the first station. Based on this solution, the value of the duration field of the announcement frame is set to the first duration, the end time of the first duration is not later than the end time of the target trigger frame or is not later than the start time of the target TB PPDU, the target trigger frame may include the second trigger frame sent by the slave access point to the second station associated with the slave access point, and the target TB PPDU may include the second TB PPDU sent by the second station associated with the slave access point to the slave access point. Therefore, after the second station associated with the slave AP is triggered by the second trigger frame, a basic NAV that is set in the second station has been reduced to 0 before the transmission of the second TB PPDU. Therefore, assuming that physical carrier sensing for the second station is idle, the second station can successfully send the second TB PPDU to the associated slave access point. This resolves a failure in a cooperation procedure in a current technology due to a possible failure of the second station associated with the slave access point in sending the second TB PPDU to the slave access point because the basic NAV in the second station is currently not 0 when the second station is triggered by the second trigger frame sent by the slave access point to respond.

In an embodiment, the target trigger frame further includes a second trigger frame, and the target TB PPDU further includes a second TB PPDU, where the second trigger frame is a trigger frame sent by the slave access point to the second station associated with the slave access point, and the second TB PPDU is a TB PPDU sent by the second station associated with the slave access point to the slave access point.

In an embodiment, a value of a duration field of the first trigger frame is determined according to a preset rule. Because an indication by the master AP is not required in this method, signaling overheads can be reduced.

In an example, the preset rule includes: the value of the duration field of the first trigger frame is set to be equal to a length of time of an SIFS+a length of transmission time of the first TB PPDU+the length of time of the SIFS+a length of transmission time of a first block acknowledgment (BA) to be sent by the master access point+the length of time of the SIFS+a fixed length of time. In this way, it can be ensured that the transmission of a next radio frame of the first BA is not interfered by contention initiated by another station. If the next radio frame of the first BA has a response frame or still has data to be transmitted, a TXOP time may be further extended by using a duration field of the next radio frame of the first BA. This is not limited in this embodiment of this application.

In another example, the value of the duration field of the first trigger frame is set to be equal to the length of time of the SIFS+the length of transmission time of the first TB PPDU+the length of time of the SIFS+the length of transmission time of the first BA+the length of time of the SIFS. In this way, it can be ensured that the start of the transmission of the next radio frame of the first BA is not interfered by contention initiated by another station, that is, a channel is accessed with the highest priority. If the next radio frame of the first BA has a response frame or still has data to be transmitted, the TXOP time may be further extended by using the duration field of the next radio frame of the first BA. This is not limited in this embodiment of this application.

In still another example, the value of the duration field of the first trigger frame is set to be equal to the length of time of the SIFS+the length of transmission time of the first TB PPDU+the length of time of the SIFS+the length of time of the first BA. This preset rule is applicable when the first BA is the last radio frame of the current TXOP. In this way, it can be ensured that the transmission of the first BA is not interfered by contention initiated by another station.

In an embodiment, the fixed length of time is a length of transmission time of an acknowledgment (ACK) frame; or the fixed length of time is a length of transmission time of an announcement frame at the lowest rate; or the fixed length of time is a length of transmission time of an announcement frame.

With reference to the first or the second aspect, in an embodiment, the announcement frame includes a preset time field; correspondingly, the value of the duration field of the target trigger frame is set based on a value of the preset time field. Because the value of the preset time field can be flexibly set by the master AP, the value of the duration field of the target trigger frame can be set in this solution with more flexibility.

In an example, the value of the preset time field is set to be equal to a length of time of an SIFS+a length of transmission time of the target TB PPDU+the length of time of the SIFS+a length of transmission time of a target block acknowledgment (BA)+the length of time of the SIFS+a length of transmission time of a next radio frame of the target BA, where the target BA is a response frame for the target TB PPDU. In this way, it can be ensured that the transmission of the next radio frame of the target BA is not interfered by contention initiated by another station. If the next radio frame of the target BA has a response frame or still has data to be transmitted, a TXOP time may be further extended by using a duration field of the next radio frame of the target BA. This is not limited in this embodiment of this application.

In another example, when the target BA is the last radio frame in the current TXOP, the value of the preset time field is set to be equal to the length of time of the SIFS+the length of transmission time of the target TB PPDU+the length of time of the SIFS+the length of transmission time of target BA. In this way, it can be ensured that the transmission of the target BA is not interfered by contention initiated by another station.

With reference to the first or the second aspect, in an embodiment, the end time of the first duration being not later than the end time of the target trigger frame includes: the first duration≤the length of time of the short inter-frame space SIFS+the length of transmission time of the target trigger frame. In an example, a start time of the first duration is an end time of the announcement frame.

With reference to the first or the second aspect, in an embodiment, the end time of the first duration being not later than the start time of the target TB PPDU includes: the first duration≤the length of time of the SIFS+the length of transmission time of the target trigger frame+the length of time of the SIFS. In an example, a start time of the first duration is an end time of the announcement frame.

According to a third aspect, a cooperative communication method is provided. The method includes: receiving, by a second station associated with a slave access point, a second trigger frame from the slave access point; determining, by the second station, that a station that is recorded by the second station and that sets a third basic network allocation vector (basic NAV) for the second station is a master access point corresponding to the slave access point; and sending, by the second station, a second trigger based (TB) physical layer protocol data unit (PPDU) to the slave access point. Based on this solution, a rule is introduced in this embodiment of this application as follows: If the second station associated with the slave AP determines that the station that is recorded by the second station and that sets the third basic NAV for the second station is the master AP corresponding to the slave AP, the second station associated with the slave AP sends the second TB PPDU to the slave AP. This resolves a failure in a cooperation procedure in a current technology due to a possible failure of the second station associated with the slave AP in sending the second TB PPDU to the slave AP because the basic NAV in the second station is currently not 0 when the second station is triggered by the second trigger frame sent by the slave AP to respond.

In an embodiment, before the receiving, by the second station, a second trigger frame from the slave access point, the method further includes: receiving, by the second station, an announcement frame, where the announcement frame is a previous radio frame of the second trigger frame; and the determining, by the second station, that a station that is recorded by the second station and that sets a third basic NAV for the second station is a master access point associated with the slave access point includes: determining, by the second station, that a transmitter address in the announcement frame is the same as a media access control MAC address that is recorded by the slave access point and that is of the station that sets the third basic NAV for the slave access point.

In an embodiment, the second trigger frame includes a MAC address of the master access point corresponding to the slave access point; and the determining, by the second station, that a station that is recorded by the second station and that sets a third basic NAV for the second station is a master access point associated with the slave access point includes: determining, by the second station, that the MAC address of the master access point is the same as a MAC address that is recorded by the slave access point and that is of the station that sets the third basic NAV for the slave access point.

In an embodiment, the second trigger frame includes a transmitter address field, and a value of the transmitter address field is set to a MAC address of the master access point corresponding to the slave access point; and the determining, by the second station, that a station that is recorded by the second station and that sets a third basic NAV for the second station is a master access point associated with the slave access point includes: determining, by the second station, that a transmitter address in the second trigger frame is the same as a MAC address that is recorded by the slave access point and that is of the station that sets the third basic NAV for the slave access point. It should be noted that in this implementation, when receiving the second trigger frame, the second station needs to be able to accurately identify whether the triggered station is the second station. If identification is based on an association identifier AID, during the AID assigning process, it is necessary to prevent an AID of the second station from being the same as an AID of an associated station in a master BSS (for example, a first station associated with the master AP).

In an embodiment, before the sending, by the second station, a second TB PPDU to the slave access point, the method further includes: setting, by the second station, the third basic NAV to 0, so that an existing basic NAV use rule does not need to be changed.

In an embodiment, before the sending, by the second station, a second TB PPDU to the slave access point, the method further includes: ignoring, by the second station, the third basic NAV and then determining that a value of a fourth basic NAV in the second station is 0. In this way, the existing basic NAV use rule can be less changed.

According to a fourth aspect, a cooperative communication method is provided. The method includes: receiving, by a slave access point, an announcement frame from a master access point; determining, by the slave access point, that a transmitter address in the announcement frame is the same as a media access control (MAC) address that is recorded by the slave access point and that is of a station that sets a first basic network allocation vector (basic NAV) for the slave access point; and sending, by the slave access point, a next radio frame to a second station associated with the slave access point. Based on this solution, a rule is introduced in this embodiment of this application as follows: If the slave AP determines that the transmitter address in the announcement frame is the same as the MAC address that is recorded by the slave station and that is of the station that sets the first basic NAV for the slave AP, the slave AP sends the next radio frame to the second station associated with the slave AP. This resolves a failure in a cooperation procedure in a current technology due to a possible failure of the second station associated with the slave AP in sending a second TB PPDU to the slave AP because a basic NAV in the second station is currently not 0 when the second station is triggered by a second trigger frame sent by the slave AP to respond.

In an embodiment, the next radio frame is a second trigger frame; and the method further includes: receiving, by the slave access point, a second trigger based (TB) physical layer protocol data unit (PPDU) from the second station. That is, this solution can be applied to uplink data transmission.

In an embodiment, the second trigger frame includes a MAC address of the master access point.

In an embodiment, the second trigger frame includes a transmitter address field, where a value of the transmitter address field is set to the MAC address of the master access point.

In an embodiment, an association identifier AID of the second station is different from an AID of a station associated with the master access point.

In an embodiment, the next radio frame is a second PPDU. That is, this solution can be applied to downlink data transmission.

In an embodiment, before the slave access point sends the second trigger frame to the second station, the method further includes: setting, by the slave access point, the first basic NAV to 0. In this way, an existing basic NAV use rule does not need to be changed.

In an embodiment, before the slave access point sends the second trigger frame to the second station, the method further includes: ignoring, by the slave access point, the first basic NAV and then determining that a value of a second basic NAV in the slave access point is 0. In this way, the existing basic NAV use rule can be less changed.

According to a fifth aspect, a communications apparatus is provided to implement the foregoing methods. The communications apparatus may be the foregoing slave access point in the first aspect or the fourth aspect, or an apparatus including the foregoing slave access point; or the communications apparatus may be the foregoing master access point in the second aspect, or an apparatus including the foregoing master access point; or the communications apparatus may be the foregoing second station associated with the slave access point in the third aspect, or an apparatus including the foregoing second station associated with the slave access point. The communications apparatus includes a corresponding module, unit, or means for implementing the foregoing method. The module, unit, or means may be implemented by using hardware or software, or implemented by using hardware by executing corresponding software. The hardware or the software includes one or more modules or units corresponding to the function.

According to a sixth aspect, a communications apparatus is provided, including a processor and a memory, where the memory is configured to store computer instructions, and when the processor executes the instructions, the communications apparatus performs the method according to any one of the foregoing aspects. The communications apparatus may be the foregoing slave access point in the first aspect or the fourth aspect, or an apparatus including the foregoing slave access point; or the communications apparatus may be the foregoing master access point in the second aspect, or an apparatus including the foregoing master access point; or the communications apparatus may be the foregoing second station associated with the slave access point in the third aspect, or an apparatus including the foregoing second station associated with the slave access point.

According to a seventh aspect, a communications apparatus is provided, and includes a processor. The processor is configured to: after being coupled to a memory and reading instructions in the memory, perform, according to the instructions, the method according to any one of the foregoing aspects. The communications apparatus may be the foregoing slave access point in the first aspect or the fourth aspect, or an apparatus including the foregoing slave access point; or the communications apparatus may be the foregoing master access point in the second aspect, or an apparatus including the foregoing master access point; or the communications apparatus may be the foregoing second station associated with the slave access point in the third aspect, or an apparatus including the foregoing second station associated with the slave access point.

According to an eighth aspect, a computer-readable storage medium is provided. The computer-readable storage medium stores instructions, and when the instructions are run on a computer, the computer is enabled to perform the method according to any one of the foregoing aspects.

According to a ninth aspect, a computer program product including instructions is provided. When the computer program product runs on a computer, the computer is enabled to perform the method according to any one of the foregoing aspects.

According to a tenth aspect, a communications apparatus (for example, the communications apparatus may be a chip or a chip system) is provided. The communications apparatus includes a processor, configured to implement a function in any one of the foregoing aspects. In an embodiment, the communications apparatus further includes a memory, where the memory is configured to store necessary program instructions and data. When the communications apparatus is the chip system, the communications apparatus may include a chip, or may include a chip and another discrete component.

For technical effects brought by any design in the fifth aspect to the tenth aspect, refer to technical effects brought by different designs in the first aspect to the fourth aspect. Details are not described herein again.

According to an eleventh aspect, a cooperative communications system is provided. The communications system includes the slave access point according to the first aspect and the master access point according to the second aspect; or the communications system includes the second station associated with the slave access point according to the third aspect and the slave access point according to the fourth aspect.

BRIEF DESCRIPTION OF DRAWINGS

FIG. 6 is a diagram of an existing AP cooperation procedure for downlink data transmission;

DETAILED DESCRIPTION OF EMBODIMENTS

Figure 1:
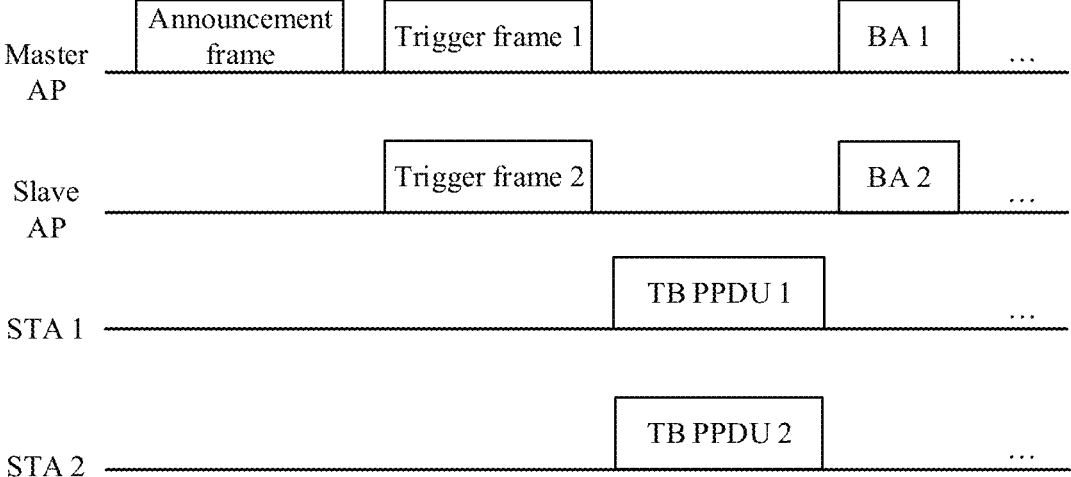
FIG. 1 is a diagram of an existing AP cooperation procedure for uplink data transmission.

For ease of understanding of the technical solutions in the embodiments of this application, the technologies related to this application are first briefly described as follows.

First, each station in a conventional wireless local area network (WLAN) network obtains the usage right of a channel through channel contention, such as enhanced distributed channel access (EDCA), and then sends data of the station, without coordinating a station in an adjacent BSS for concurrent transmission. Such a method is relatively simple but inefficient. Concurrent transmission implemented through cooperation between two or more stations in adjacent BSSs can improve system efficiency.

An Institute of Electrical and Electronics Engineers (IEEE) 802.11ax system introduces a spatial reuse (SR) technique, which can achieve the effect of parallel transmission on multiple links. However, this is not a result of mutual negotiation between two links. Instead, there is transmission on an initial link, and then during the transmission on the initial link, a spatial reuse station determines, based on information such as received channel strength of the initial link and a reuse parameter indication, whether a spatial reuse link can be initiated. Before such a concurrent mode starts, stations in two BSSs are not required to negotiate with each other, and transmission on the two links do not start simultaneously.

Furthermore, multi-link concurrent transmission in multi-BSS is referred to as AP cooperation in this patent. A form of cooperation thereof may be divided into many different types, which are summarized into four types herein:

A first type of cooperation is coordinated spatial reuse, that is, forming multiple concurrent links in multiple BSSs. In such cooperation, multiple non-interfering links are generally formed through user selection and power control. Stations between the multiple links are not required to exchange data or to exchange channel information.

A second type of cooperation is coordinated orthogonal frequency division multiple access (OFDMA), that is, transmission on two or more concurrent links are performed simultaneously through cooperation between stations in two or more BSSs. In such cooperation, multiple non-interfering links are generally formed by selecting different resource units (RUs) in OFDMA transmission for different BSSs. Stations between the multiple links are not required to exchange data or to exchange channel information.

A third type of cooperation is coordinated beamforming, that is, a transmitting station in two or more BSSs first obtains channel information between the station and a receiving station of a current BSS and a receiving station in a slave BSS, and then uses beamforming to make interference of a signal sent by each transmitting station to a non-target receiving station zeroed or significantly reduced, so that transmission on multiple links can be performed concurrently. In such cooperation, the multiple links are not required to exchange data, but are required to exchange channel information.

A fourth type of cooperation is joint transmission, that is, transmitting stations in two or more BSSs exchange data, and each transmitting station is required to obtain channel information between the station and all receiving stations. Then the multiple stations send data to the receiving stations jointly. In such cooperation, the multiple links are required not only to exchange data, but also to exchange channel information.

It should be noted that, in a broad sense, a station in the embodiments of this application includes an AP or a STA associated with the AP. A general description is provided herein, and details are not described below.

Second, a WLAN system operates on an unlicensed band, and its wireless channel is shared. Generally, channel access is required before a station performs transmission. A brief description of a channel access procedure is provided as follows:

Before transmitting, a station shall sense to determine whether another station is transmitting (for a STA to transmit, it shall sense the medium to determine if another STA is transmitting). If a channel is sensed to be busy, the transmission procedure shall defer until the channel becomes idle. After the channel becomes idle, a random backoff is required before a station transmits. The random backoff is used to deal with a collision between multiple potential transmitting stations. The station can transmit after the end of the random backoff procedure when the channel is idle. In addition, before a station transmits, the station may further exchange with a target station a short control frame, such as request-to-send (RTS)/clear-to-send (CTS), to further reduce loss of a throughput due to a collision. After a collision of short control frame exchanges, a transmitting station can know as soon as possible that the collision has occurred, and therefore access a channel again after another random backoff, avoiding a failure in transmission of an entire data frame due to direct transmission of a long data frame in the event of a collision. For the procedure of channel access, refer to the IEEE 802.11 standard, which is not described in detail herein.

Sensing in the embodiments of this application is divided into physical carrier sensing and virtual carrier sensing. Physical carrier sensing is achieved by sensing energy on a channel and a signal of a WLAN radio frame. When received energy or strength of a received WLAN radio frame is less than a threshold, the physical carrier sensing is idle; otherwise, the physical carrier sensing is busy. Virtual carrier sensing is implemented by setting a NAV. A NAV is maintained. When a value of the NAV is not 0, the virtual carrier sensing is busy, and when the NAV value is 0, the virtual carrier sensing is idle. Generally, when both the physical carrier sensing and the virtual carrier sensing are idle, a station is allowed to perform a random backoff, and then proceeds to a subsequent transmission procedure.

In an early WLAN system, a station has only one NAV. After the station correctly receives a radio frame, the station may update the NAV based on a value of a duration field in the radio frame. When a receiver address in the radio frame is its own medium access control (MAC) address, the station does not update the NAV. For another radio frame, when a value of its duration field is greater than a value of the current NAV of the station, the NAV is updated based on the value of the duration field. The NAV mechanism can effectively resolve a collision problem caused by hidden nodes.

The hidden nodes herein are stations that are out of signal coverage of a transmitting station, but whose transmitted signals may interfere with the station of a receiving station. In the process of sending a radio frame by the transmitting station, the hidden nodes cannot perceive the transmission of the transmitting station, and therefore also send radio frames simultaneously. As a result, the receiving station fails to correctly receive the radio frame due to interference. After the use of virtual carrier sensing, when the transmitting station successfully contends for a channel, the transmitting station may first exchange short control frames with the receiving station. Duration fields of the two short frames exchanged are used to set a NAV for a non-target station around the two stations, so as to ensure that the hidden nodes no longer contend for a channel or transmit a radio frame during a time protected by the NAV. This period of time protected by the NAV is usually referred to as a transmission opportunity (TXOP).

In the IEEE 802.11ax standard, two NAVs are introduced for finer management, one of which is referred to as an intra-BSS NAV, and the other is referred to as a basic NAV. The intra-BSS NAV is updated with an intra-BSS PPDU, and the basic NAV is updated with an inter-BSS PPDU or when it is impossible to distinguish whether it is an intra-BSS PPDU or an inter-BSS PPDU. The inter-BSS PPDU is simply a PPDU transmitted from a STA or an AP outside the current BSS, and the intra-BSS PPDU is simply a PPDU transmitted from an AP or a STA of the current BSS. For a method for distinguishing between an inter-BSS PPDU and an intra-BSS PPDU, refer to the IEEE 802.11ax standard, and details are not described herein.

An AP or a STA that is not a TXOP holder updates an intra-BSS NAV if and only if a received radio frame (hereinafter referred to as a received frame) satisfies all the following conditions:

First, the received frame is an intra-BSS frame.

Second, a value of a duration field of the received frame is greater than a value of a current intra-BSS NAV of the station.

Third, a destination address in the received frame is not a MAC address of the station, or the received frame does not trigger the station to respond immediately, or the received frame is a trigger frame.

A station updates a basic NAV if and only if the received frame satisfies all the following conditions:

First, the received frame is an inter-BSS frame, or it is impossible to distinguish whether it is an intra-BSS frame or an inter-BSS frame.

Second, a value of a duration field of the received frame is greater than a value of a current basic NAV of the station.

Third, a destination address in the received frame is not a MAC address of the station.

When the station actively transmits a radio frame, the virtual carrier sensing is idle only if the value of the intra-BSS NAV and the value of the basic NAV are both equal to 0. In this case, if the physical carrier sensing is also idle, the station can perform a random backoff. When the station is triggered by an associated AP to respond immediately, if the physical carrier sensing for the station is idle and the value of the basic NAV is 0, the station can respond, regardless of whether the value of the intra-BSS NAV is 0. If the basic NAV value is not 0, no response can be made even if a result of the physical carrier sensing is idle.

The following describes the technical solutions in the embodiments of this application with reference to the accompanying drawings in the embodiments of this application. It should be noted that network architectures and service scenarios described in the embodiments of this application are intended to describe the technical solutions in the embodiments of this application more clearly, and do not constitute a limitation on the technical solutions provided in the embodiments of this application. A person of ordinary skill in the art may know that as the network architecture evolves and a new service scenario emerges, the technical solutions provided in the embodiments of this application are also applicable to a similar technical problem.

Figure 2:
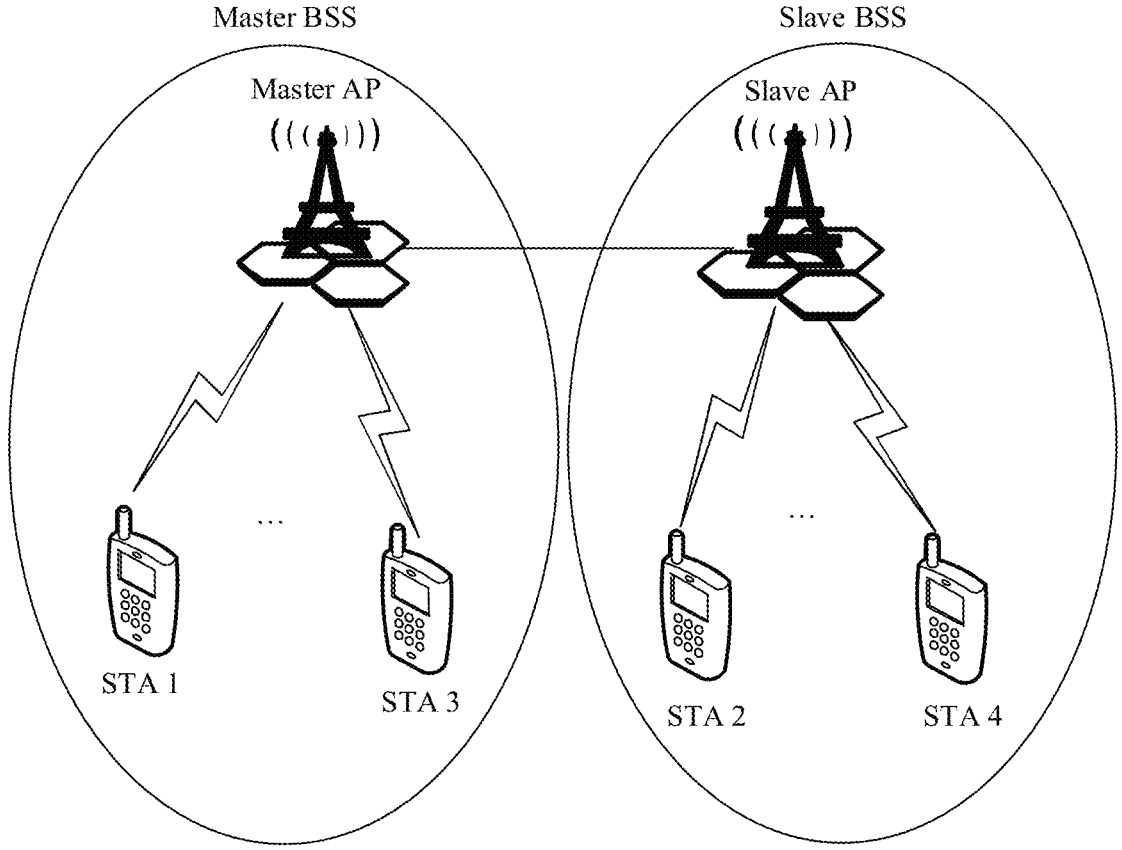
FIG. 2 is a diagram of a WLAN communications system according to an embodiment of this application.

FIG. 2 is a diagram of a WLAN communications system 20 according to an embodiment of this application. For ease of description, this application uses a WLAN communications system as an example for description. The WLAN communications system 20 includes a master AP and one or more slave APs that cooperate with the master AP (one slave AP is exemplarily drawn in FIG. 2). A BSS to which the master AP belongs may be referred to as a master BSS, a BSS to which a slave AP belongs may be referred to as a slave BSS, and the master AP can communicate with the slave AP. In addition, the WLAN communications system 20 further includes one or more STAs (which may be referred to as first STA) associated with the master AP and one or more STAs (which may be referred to as second STA) associated with the slave AP. The one or more STAs associated with the master AP may be a SAT 1 and a STA 3 in FIG. 2, and the one or more STAs associated with the slave AP may be a SAT 2 and a STA 4 in FIG. 2, for example.

It should be noted that the WLAN communications system 20 is not only applicable to single-user uplink or downlink (DL) transmission, but also applicable to multi-user uplink or downlink transmission, which is not limited in the embodiments of this application.

For a method for cooperative communication based on the WLAN communications system 20, refer to subsequent method embodiments, and details are not described herein.

Optionally, a related function of the master AP or the slave AP or the second STA associated with the slave AP in the embodiments of this application may be implemented by one device, or may be implemented by a plurality of devices together, or may be implemented by one or more functional modules in one device, which is not limited in the embodiments of this application. It can be understood that the foregoing function may be a network element on a hardware device, or may be a software function running on dedicated hardware, or may be a combination of hardware and software, or may be a virtualization function instantiated on a platform (for example, a cloud platform).

Figure 3:
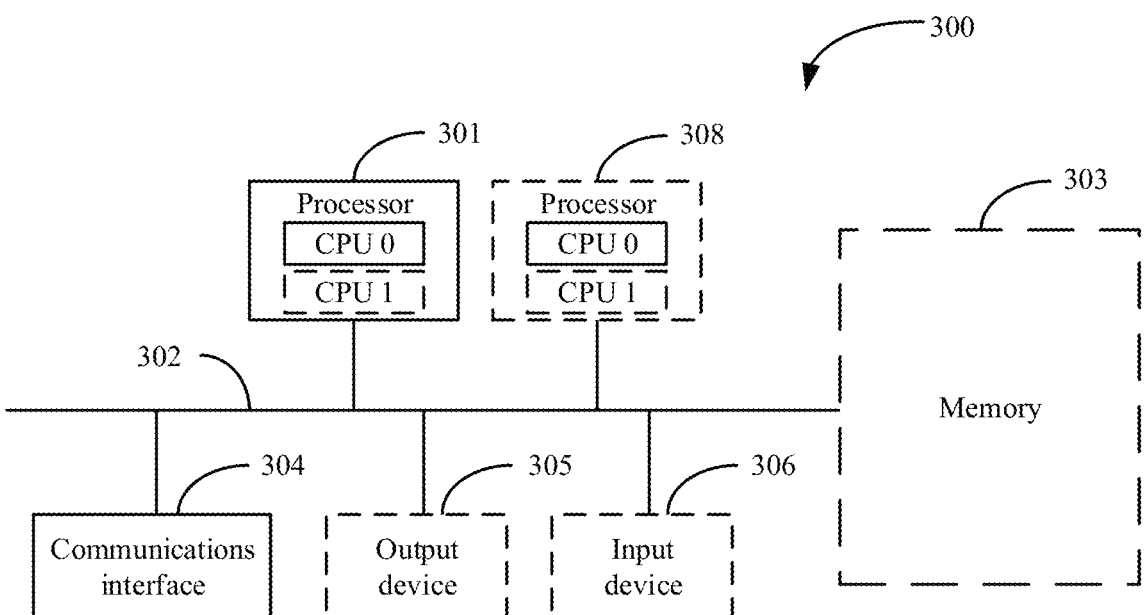
FIG. 3 is a diagram of a communications device according to an embodiment of this application.

For example, a related function of the master AP or the slave AP or the second STA associated with the slave AP in the embodiments of this application may be implemented by a communications device 300 in FIG. 3. FIG. 3 is a diagram of a communications device 300 according to an embodiment of this application. The communications device 300 includes one or more processors 301, a communications line 302, and at least one communications interface (in FIG. 3, only an example in which a communications interface 304 and one processor 301 are included is used for description). Optionally, the communications device 300 may further include a memory 303.

The processor 301 may be a general-purpose central processing unit (CPU), a microprocessor, an application-specific integrated circuit (ASIC), or one or more integrated circuits configured to control program execution of the solutions in this application.

The communications line 302 may include a path used to connect different components.

The communications interface 304 may be a transceiver module configured to communicate with another device or a communications network such as the Ethernet, a RAN, or a wireless local area network (WLAN). For example, the transceiver module may be an apparatus such as a trans- ceiver or a transceiver. Optionally, the communications interface 304 may alternatively be a transceiver circuit located inside the processor 301, to implement signal input and signal output of the processor.

The memory 303 may be an apparatus having a storage function. For example, the memory 303 may be a read-only memory (ROM) or another type of static storage device that can store static information and instructions, or a random access memory (RAM) or another type of dynamic storage device that can store information and instructions. The memory 303 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory 303 is not limited thereto. The memory may exist independently, and be connected to the processor by using the communication line 302. Alter- natively, the memory may be integrated with the processor.

The memory 303 is configured to store computer-execut- able instructions for executing the solutions in this applica- tion, and the processor 301 controls execution of the com- puter-executable instructions. The processor 301 is configured to execute the computer-executable instructions stored in the memory 303, to implement a cooperative communication method provided in the embodiments of this application.

Alternatively, optionally, in the embodiments of this application, the processor 301 may perform processing related functions in a cooperative communication method provided in the following embodiment of this application, and the communications interface 304 is responsible for communication with another device or a communications network. This is not limited in the embodiments of this application.

Optionally, the computer-executable instructions in the embodiments of this application may also be referred to as application program code. This is not limited in the embodi- ments of this application.

In an embodiment, the processor 301 may include one or more CPUs, for example, a CPU 0 and a CPU 1 in FIG. 3.

In an embodiment, the communications device 300 may include a plurality of processors such as the processor 301 and a processor 308 in FIG. 3. Each of the processors may be a single-core (single-CPU) processor, or may be a multi- core (multi-CPU) processor. Herein the processor may be one or more devices, circuits, and/or processing cores con- figured to process data (for example, computer program instructions).

In an embodiment, the communications device 300 may further include an output device 305 and an input device 306. The output device 305 communicates with the proces- sor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive an input of a user in a plurality of manners. For example, the input device 306 may be a mouse, a keyboard, a touchscreen device, or a sensing device.

The communications device 300 sometimes may also be referred to as a communications apparatus, and may be a general-purpose device or a dedicated device. For example, the communications device 300 may be an AP such as a server, a router, a switch, or a bridge, or the communications device 300 may be a STA such as a mobile phone, a tablet computer, a computer notebook, a smart watch, or a smart TV. The embodiments of this application do not limit a type of the communications device 300.

The following describes in detail a cooperative commu- nication method provided in the embodiments of this appli- cation with reference to FIG. 1 to FIG. 3.

It should be noted that in the following embodiments of this application, names of messages between network ele- ments, names of parameters in the messages, or the like are merely examples, and there may be other names. This is not limited in the embodiments of this application.

It should be noted that cooperation in the embodiments of this application may be any one of coordinated spatial reuse, coordinated OFDMA, coordinated beamforming, or joint transmission. Certainly, there may be other manners of cooperation. A general description is provided herein, and details are not described below. For the related descriptions of coordinated spatial reuse, coordinated OFDMA, coordi- nated beamforming, or joint transmission, refer to the begin- ning section of the detailed descriptions, and details are not described herein again.

It should be noted that, in a procedure in the embodiments of this application, after a master AP has sent an announce- ment frame, a receiver end may send an ACK in response to the announcement frame, or may not send an ACK. In the embodiments of this application, the procedure in which after the master AP has sent the announcement frame, the receiver end does not send the ACK in response to the announcement frame is used as an example for description. However, the implementation thereof is also applicable to the procedure in which after the master AP has sent the announcement frame, the receiver end sends the ACK in response to the announcement frame. A general description is provided herein, and details are not described below.

Figure 4:
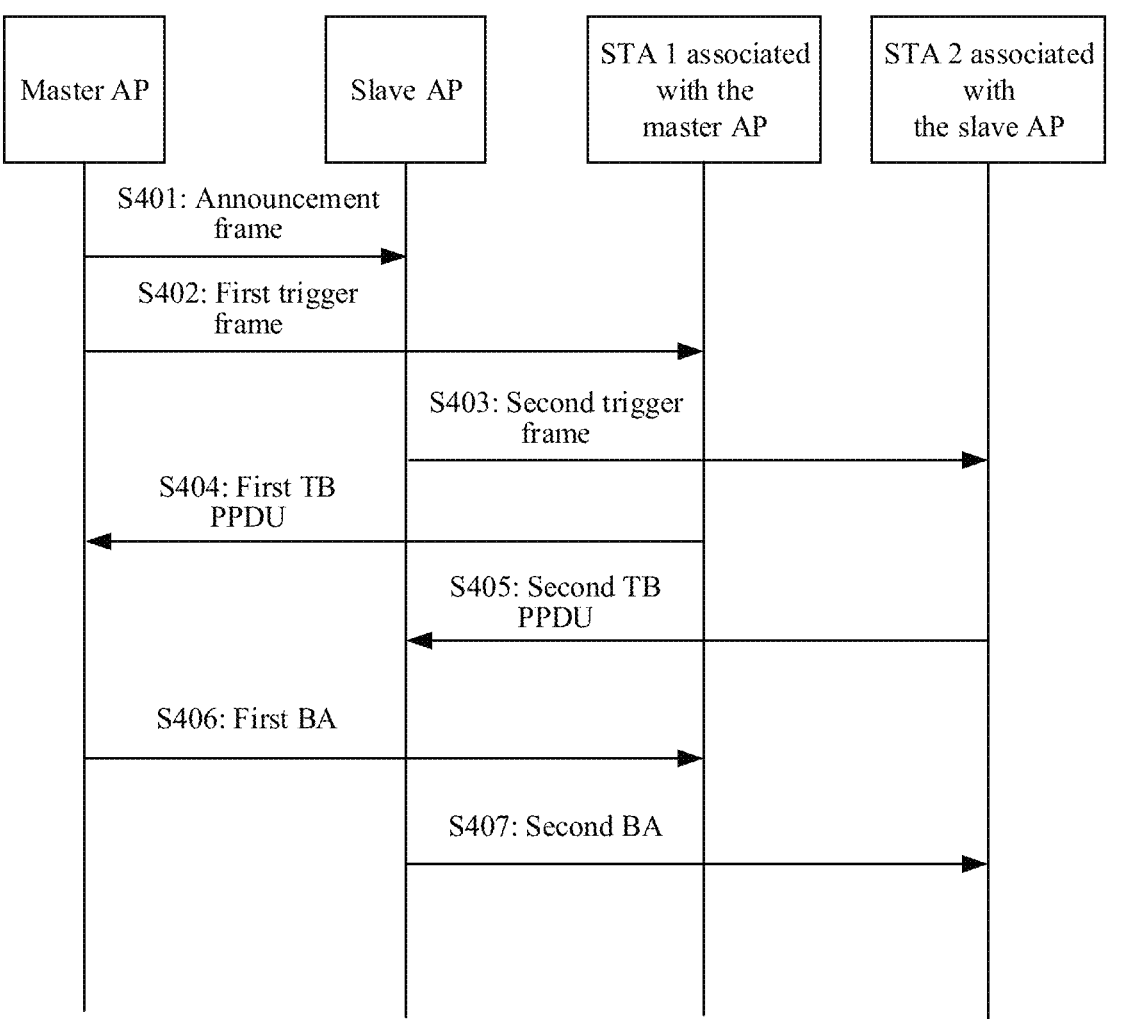
FIG. 4 is a flowchart of a cooperative communication method according to an embodiment of this application.

Communication between the master AP, any first STA (such as the STA 1) associated with the master AP, the slave AP, and any second STA (such as the STA 2) associated with the slave AP in the WLAN communications system shown in FIG. 2 is used as an example. FIG. 4 is a flowchart of a cooperative communication method according to an embodiment of this application. The cooperative communi- cation method is implemented by gradually extending a TXOP duration, and includes the following steps.

S401: The master AP sends an announcement frame to the slave AP. Correspondingly, the slave AP receives the announcement frame from the master AP.

The announcement frame includes a duration field, a value of the duration field of the announcement frame is set to a first duration (that is, the first duration is set by the master AP), an end time of the first duration is not later than an end time of a target trigger frame or is not later than a start time of a target TB PPDU, the target trigger frame is a next radio frame of the announcement frame, and the target TB PPDU is a response frame for the target trigger frame, where the target trigger frame includes a first trigger frame (here- inafter referred to as trigger 1) to be sent by the master AP to the STA 1, and/or a second trigger frame (hereinafter referred to as trigger 2) to be sent by the slave AP to the STA 2. The target TB PPDU includes a response frame for the trigger 1, namely, a first TB PPDU (hereinafter referred to as TB PPDU 1), and/or a response frame for the trigger 2, namely, a second TB PPDU (hereinafter referred to as TB PPDU 2).

Optionally, the announcement frame further includes a length of transmission time of the target trigger, a length of transmission time of the target TB PPDU, and a length of transmission time of a target BA; or the length of transmission time of the target trigger, the length of transmission time of the target TB PPDU, and the length of transmission time of the target BA may alternatively be calculated based on a related parameter (such as a frame length and a transmission rate) carried in the announcement frame. For specific descriptions, refer to a current technology, and details are not described herein. The target BA is a response frame for the target TB PPDU, and includes a first BA (hereinafter referred to as BA 1) that is a response frame for the TB PPDU 1, and/or a second BA (hereinafter referred to as BA 2) that is a response frame for the TB PPDU 2. A general description is provided herein, and details are not described below.

Optionally, the duration field in this embodiment of this application may also be referred to as a duration/identification (ID) field. A general description is provided herein, and details are not described below.

Optionally, in this embodiment of this application, the end time of the first duration being not later than the end time of the target trigger frame includes:

the first duration≤a length of time of an SIFS+the length of transmission time of the target trigger frame; the end time of the first duration being not later than an end time of the target TB PPDU frame includes: the first duration≤the length of time of the SIFS+the length of transmission time of the target trigger frame+the length of time of the SIFS. Optionally, if the target TB PPDU is sent after an SIFS interval subsequent to the reception of the target trigger frame, the end time of the first duration being not later than the end time of the target TB PPDU frame is equivalent to the end time of the first duration being not later than the end time of the target trigger frame+the length of time of the SIFS. A general description is provided below, and details are not described below. Optionally, if a receiver end may send an ACK in response to the announcement frame after the master AP has sent the announcement frame, the end time of the first duration being not later than the end time of the target trigger frame includes: the first duration≤the length of time of the SIFS+a length of transmission time of the ACK+the length of transmission time of the target trigger frame; and the end time of the first duration being not later than the end time of the target TB PPDU frame includes: the first duration≤the length of time of the SIFS+the length of transmission time of the ACK+the length of transmission time of the target trigger frame+the length of time of the SIFS. Optionally, if another frame is included before the trigger frame, the first duration may be adjusted adaptively such that the end time of the first duration is not later than the end time of the target trigger frame or is not later than the end time of the target TB PPDU frame. Details are not described herein. Optionally, a start time of the first duration is an end time of the announcement frame.

In addition, in this embodiment of this application, when the master AP sends an announcement frame to the slave AP, the STA 1 associated with the master AP and the STA 2 associated with the slave AP may also receive the announcement frame, so that an intra-BSS NAV may be set for the STA 1, and a basic NAV may be set for the STA 2. Values of the intra-BSS NAV and the basic NAV are both equal to the value of the first duration.

S402: The master AP sends the trigger 1 to the STA 1 associated with the master AP. Correspondingly, the STA 1 associated with the master AP receives the trigger 1 from the master AP.

The trigger 1 includes a duration field, and a value of the duration field of the trigger 1 is not limited in this embodiment of this application.

S403: The slave AP sends the trigger 2 to the STA 2 associated with the slave AP. Correspondingly, the STA 2 associated with the slave AP receives the trigger 2 from the slave AP.

The trigger 2 includes a duration field, and a value of the duration field of the trigger 2 is not limited in this embodiment of this application.

It should be noted that, in this embodiment of this application, because the master AP is a TXOP holder, the duration field of the trigger 2 and the duration field of the trigger 1 should be set to an equal value. A general description is provided herein, and details are not described below.

Optionally, in this embodiment of this application, the master AP sends the trigger 1 to the STA 1 associated with the master AP while the slave AP sends the trigger 2 to the STA 2 associated with the slave AP, that is, transmission of the trigger 1 and transmission of the trigger 2 end simultaneously. A general description is provided herein, and details are not described below. It should be noted that, based on an operating principle of a transceiver, "simultaneously" in this embodiment is essential, and processing on the foregoing master AP and slave AP does not need to be strictly limited to have no time difference, provided that the foregoing processing is basically the same in terms of a time dimension.

It should be noted that a format of the trigger frame (including the trigger 1 or the trigger 2) is not limited in this embodiment of this application, and any radio frame that can trigger the STA 1 or the STA 2 to respond can be referred to as a trigger frame. A general description is provided herein, and details are not described below.

S404: After receiving the trigger 1, the STA 1 associated with the master AP sends the TB PPDU 1 to the master AP. Correspondingly, the master AP receives the TB PPDU 1 from the STA 1 associated with the master AP.

In this embodiment of this application, a value of a duration field included in the TB PPDU 1 is determined based on the value of the duration field of the trigger 1, for example, the value of the duration field in the TB PPDU 1=the value of the duration field of the trigger 1−the length of time of the SIFS−a length of transmission time of the TB PPDU 1.

As described in the beginning section of the detailed descriptions, when the station is triggered by an associated AP to respond immediately, if the physical carrier sensing for the station is idle and the value of the basic NAV is 0, the station can respond, regardless of whether the value of the intra-BSS NAV is 0. In this embodiment of this application, after the STA 1 associated with the master AP receives the trigger 1, if physical carrier sensing for the STA 1 is idle, and a value of a basic NAV of the STA 1 is 0, the STA 1 can send the TB PPDU 1 to the master AP. Certainly, if the physical carrier sensing for the STA 1 is busy, or the value of the basic NAV of the STA 1 is not 0, the STA 1 cannot send the TB PPDU 1 to the master AP, that is, step S404 is not performed. A general description is provided herein, and details are not described below.

S405: After receiving the trigger 2, the STA 2 associated with the slave AP sends the TB PPDU 2 to the slave AP. Correspondingly, the slave AP receives the TB PPDU 2 from the STA 2 associated with the slave AP.

In this embodiment of this application, the value of the duration field of the announcement frame is set to the first duration, the end time of the first duration is not later than the end time of the target trigger frame or is not later than the start time of the target TB PPDU, the target trigger frame includes the trigger 2, and the target TB PPDU includes the TB PPDU 2. Therefore, after the STA 2 associated with the slave AP is triggered by the trigger 2, the basic NAV that is set in the STA 2 has been reduced to 0 before the transmission of the TB PPDU 2. When a station is triggered by its associated AP to respond immediately, there is no need to consider whether a value of an intra-BSS NAV is 0. Therefore, if the physical carrier sensing for the STA 2 is idle, the STA 2 can successfully send the TB PPDU 2 to the associated slave AP.

In this embodiment of this application, a value of a duration field included in the TB PPDU 2 is determined based on the value of the duration field of the trigger 2, for example, the value of the duration field in the TB PPDU 2=the value of the duration field of the trigger 2–the length of time of the SIFS–a length of transmission time of the TB PPDU 2.

Optionally, in this embodiment of this application, transmission of the TB PPDU 1 and transmission of the TB PPDU 2 may end simultaneously.

S406: After receiving the TB PPDU 1, the master AP sends a BA 1 to the associated STA 1. Correspondingly, the STA 1 associated with the master AP receives the BA 1 from the master AP.

In this embodiment of this application, a value of a duration field included in the BA 1 is determined based on the value of the duration field of the TB PPDU 1, for example, the value of the duration field in the BA 1=the value of the duration field of the TB PPDU 1–the length of time of the SIFS–a length of transmission time of the BA 1.

S407: After receiving the TB PPDU 2, the slave AP sends a BA 2 to the associated STA 2. Correspondingly, the STA 2 associated with the slave AP receives the BA 2 from the slave AP.

In this embodiment of this application, a value of a duration field included in the BA 2 is determined based on the value of the duration field of the TB PPDU 2, for example, the value of the duration field in the BA 2=the value of the duration field of the TB PPDU 2–the length of time of the SIFS–a length of transmission time of the BA 2.

Optionally, in this embodiment of this application, the master AP may not send the trigger 1 to the STA 1 associated with the master AP, and then the STA 1 associated with the master AP does not send the TB PPDU 1 to the master AP, and the master AP does not send the BA 1 to the associated STA 1. In other words, this embodiment of this application is also applicable to a scenario in which the master AP temporarily transfers the usage right of a TXOP to the slave AP, which is not limited in this embodiment of this application.

Based on the cooperative communication method provided in this embodiment of this application, the value of the duration field of the announcement frame is set to the first duration, the end time of the first duration is not later than the end time of the target trigger frame or is not later than the start time of the target TB PPDU, the target trigger frame includes the trigger 2, and the target TB PPDU includes the TB PPDU 2. Therefore, after the STA 2 associated with the slave AP is triggered by the trigger 2, the basic NAV that is set in the STA 2 has been reduced to 0 before the transmission of the TB PPDU 2. Therefore, if the physical carrier sensing for the STA 2 is idle, the STA 2 can successfully send the TB PPDU 2 to the associated slave AP. This resolves a failure in a cooperation procedure in a current technology due to a possible failure of the STA 2 associated with the slave AP in sending the TB PPDU 2 to the slave AP because the basic NAV in the STA 2 is currently not 0 when the STA 2 is triggered by the trigger 2 sent by the slave AP to respond.

The actions of the master AP, the slave AP, or the STA 2 associated with the slave AP in steps S401 to S407 described above may be performed by the processor 301 in the communications device 300 shown in FIG. 3 invoking application program code stored in the memory 303. This embodiment of this application does not impose any limitations on this.

In an embodiment, the announcement frame in step S401 further includes a preset time field. Accordingly, the value of the duration field of the trigger 1 in step S402 and the value of the duration field of the trigger 2 in step S403 are both set based on a value of the preset time field.

Optionally, in this embodiment of this application, the value of the duration field of the trigger 1 and the value of the duration field of the trigger 2 in step S403 being both set based on a value of the preset time field may include: the value of the duration field of the trigger 1 and the value of the duration field of the trigger 2 in step S403 are equal to the value of the preset time field; or the value of the duration field of the trigger 1 and the value of the duration field of the trigger 2 in step S403 are derived based on the value of the preset time field. This is not limited in this embodiment of this application.

In an example, the value of the preset time field may be set to be equal to the length of time of the SIFS+the length of transmission time of the target TB PPDU+the length of time of the SIFS+the length of transmission time of the target BA+the length of time of the SIFS+a length of transmission time of a next radio frame of the target BA, where the target BA is the response frame for the target TB PPDU. In this way, it can be ensured that the transmission of the next radio frame of the target BA is not interfered by contention initiated by another station. If the next radio frame of the target BA has a response frame or still has data to be transmitted, the TXOP time may be further extended by using a duration field of the next radio frame of the target BA. This is not limited in this embodiment of this application.

In another example, when the target BA is the last radio frame in the current TXOP, the value of the preset time field is set to be equal to the length of time of the SIFS+the length of transmission time of the target TB PPDU+the length of time of the SIFS+the length of transmission time of the target BA. In this way, it can be ensured that the transmission of the target BA is not interfered by contention initiated by another station.

Certainly, in an implementation, the value of the preset time field may also be set to another value, which is not limited in this embodiment of this application.

The announcement frame carries the preset time field for determining the value of the duration field of the target trigger frame. Because the value of the preset time field can be flexibly set by the master AP, the value of the duration field of the target trigger frame can be set with more flexibility.

In another embodiment, the value of the duration field of the trigger 1 in step S402 and the value of the duration field of the trigger 2 in step S403 are both set according to a preset rule, where the preset rule may be predefined in the standard. Because an indication by the master AP is not required in this method, signaling overheads can be reduced.

In an example, a preset rule in the master AP may include: the value of the duration field of the trigger 1 is set to be equal to the length of time of the SIFS+the length of transmission time of the TB PPDU 1+the length of time of the SIFS+the length of transmission time of the BA 1+the length of time of the SIFS+a fixed length of time. In this way, it can be ensured that the transmission of a next radio frame of the BA 1 is not interfered by contention initiated by another station. If the next radio frame of the BA 1 has a response frame or still has data to be transmitted, the TXOP time may be further extended by using a duration field of the next radio frame of the BA 1. This is not limited in this embodiment of this application.

In another example, the preset rule in the master AP may include: the value of the duration field of the trigger 1 is set to be equal to the length of time of the SIFS+the length of transmission time of the TB PPDU 1+the length of time of the SIFS+the length of transmission time of the BA 1+the length of time of the SIFS. In this way, it can be ensured that the start of the transmission of the next radio frame of the BA 1 is not interfered by contention initiated by another station, that is, a channel is accessed with the highest priority. If the next radio frame of the BA 1 has a response frame or still has data to be transmitted, the TXOP time may be further extended by using a duration field of the next radio frame of the BA 1. This is not limited in this embodiment of this application.

In still another example, the preset rule in the master AP may include: the value of the duration field of the trigger 1 is set to be equal to the length of time of the SIFS+the length of transmission time of the TB PPDU 1+the length of time of the SIFS+the length of transmission time of the BA 1. This preset rule is applicable when the BA 1 is the last radio frame of the current TXOP. In this way, it can be ensured that the transmission of the BA 1 is not interfered by contention initiated by another station.

In an example, a preset rule in the slave AP may include: the value of the duration field of the trigger 2 is set to be equal to the length of time of the SIFS+the length of transmission time of the TB PPDU 2+the length of time of the SIFS+the length of transmission time of the BA 2+the length of time of the SIFS+a fixed length of time. In this way, it can be ensured that the transmission of a next radio frame of the BA 2 is not interfered by contention initiated by another station. If the next radio frame of the BA 2 has a response frame or still has data to be transmitted, the TXOP time may be further extended by using a duration field of the next radio frame of the BA 2. This is not limited in this embodiment of this application.

In another example, the preset rule in the slave AP may include: the value of the duration field of the trigger 2 is set to be equal to the length of time of the SIFS+the length of transmission time of the TB PPDU 2+the length of time of the SIFS+the length of transmission time of the BA 2+the length of time of the SIFS. In this way, it can be ensured that the start of the transmission of the next radio frame of the BA 2 is not interfered by contention initiated by another station, that is, a channel is accessed with the highest priority. If the next radio frame of the BA 2 has a response frame or still has data to be transmitted, the TXOP time may be further extended by using a duration field of the next radio frame of the BA 2. This is not limited in this embodiment of this application.

In still another example, the preset rule in the slave AP may include: the value of the duration field of the trigger 2 is set to be equal to the length of time of the SIFS+the length of transmission time of the TB PPDU 2+the length of time of the SIFS+the length of transmission time of the BA 2. This preset rule is applicable when the BA 2 is the last radio frame of the current TXOP. In this way, it can be ensured that the transmission of the BA 2 is not interfered by contention initiated by another station.

In an example, the fixed length of time in this embodiment of this application may be a length of transmission time of an acknowledgment (ACK) frame; or the fixed length of time may be a length of transmission time of an announcement frame at the lowest rate; or the fixed length of time may be a length of transmission time of an announcement frame. The lowest rate herein may be, for example, a modulation and coding scheme (MCS) of 0, which is not limited herein.

It should be noted that in this embodiment of this application, during the TXOP duration extension for the trigger 1 and the trigger 2, the extended TXOP duration should not exceed a TXOP limit, that is, the value of the duration field of the trigger 1 and the value of the duration field of the trigger 2 are not greater than the TXOP limit duration. A general description is provided herein, and details are not described below.

It is assumed in the foregoing descriptions that the slave AP can send the trigger 2 after the reception of the announcement frame. If a basic NAV is set for the slave AP by the announcement frame (for example, a receiver address (RA) of the announcement frame is set to a broadcast address), or a basic NAV is set for the slave AP by a radio frame from the master AP earlier than the announcement frame, a value of the basic NAV is not 0, and the slave AP may not be able to send the trigger 2. It is very common that there is another radio frame before the announcement frame. For example, after the master AP accesses a channel through contention, the master AP first exchanges an RTS/CTS frame with the STA 1 associated with the master AP, for channel protection. For another example, the master AP first collaborates with another slave AP, and then collaborates with the aforementioned slave AP in the same TXOP.

Based on this, the cooperative communication method provided in this embodiment of this application may further include: if the slave AP determines that a transmitter address (TA) of the announcement frame is the same as a MAC address that is recorded by the slave AP and that is of a station that sets a basic NAV for the slave AP, sending, by the slave AP, the trigger 2 to the STA 2 associated with the slave AP. In other words, if the transmitter address in the announcement frame is a MAC address of the master AP, and the MAC address that is recorded by the slave AP and that is of the station that sets the basic NAV for the slave AP is the MAC address of the master AP, the slave AP sends the trigger 2 to the STA 2 associated with the slave AP, regardless of whether the basic NAV in the slave AP is 0.

Similarly, the STA 2 may be directly scheduled by the master AP in cooperative communication, and if a basic NAV is set for the STA 2 by a radio frame from the master AP that is earlier than the announcement frame, a value of the basic NAV is not 0, and therefore the STA 2 may not be able to return a response frame. Therefore, the STA 2 also needs to use the same processing rule as the slave AP. The STA 2 records a MAC address of a station that sets the basic NAV for the STA 2. After the STA 2 receives a trigger frame, the STA 2 compares whether a transmitter address in the trigger frame is the same as the MAC address that is recorded by the STA 2 and that is of the station that sets the basic NAV for the STA 2. If the same, the STA 2 is allowed to respond to the trigger frame. In other words, if the transmitter address in the trigger frame is the MAC address of the master AP, and the MAC address that is recorded by the STA 2 and that is of the station that sets the basic NAV for the STA 2 is the MAC address of the master AP, the STA 2 is allowed to respond to the trigger frame, regardless of whether the basic NAV in the STA 2 is 0.

In the foregoing embodiment, gradual extension of the TXOP duration is used, in which how the master AP sets the duration field of the announcement frame is discussed. However, it is not taken into consideration how to set a duration value of another radio frame prior to the announcement frame if the master AP has already sent the another radio frame before the announcement frame. If the TXOP duration has already been set to be very long for the radio frame prior to the announcement frame, that is, an end time of the TXOP duration exceeds the start time of the TB PPDU 2, because the TXOP length cannot be shortened (unless contention free end (CF-END) is used to release the channel), even if the value of the duration field of the announcement frame is set to the aforementioned first duration, the STA 2 associated with the slave AP does not update the basic NAV based on the announcement frame because the basic NAV longer than the first duration indicated in the announcement frame has been set for the STA 2. As a result, after the STA 2 associated with the slave AP is triggered by the trigger 2, the STA 2 cannot return the TB PPDU 2 because the value of the basic NAV is not 0.

To resolve this problem, in an embodiment of this application, when the master AP sets the duration of the duration field of another radio frame prior to the announcement frame, the end time of the duration of the duration field set by the master AP cannot exceed the start time of the target TB PPDU frame in the exchange process of the announcement frame/the target trigger frame/the target TB PPDU/the target BA. In other words, if there are multiple cooperation procedures in the same TXOP, during setting of a NAV in a current cooperation procedure, it is required to consider NAV setting restrictions in a next cooperation procedure.

Figure 5:
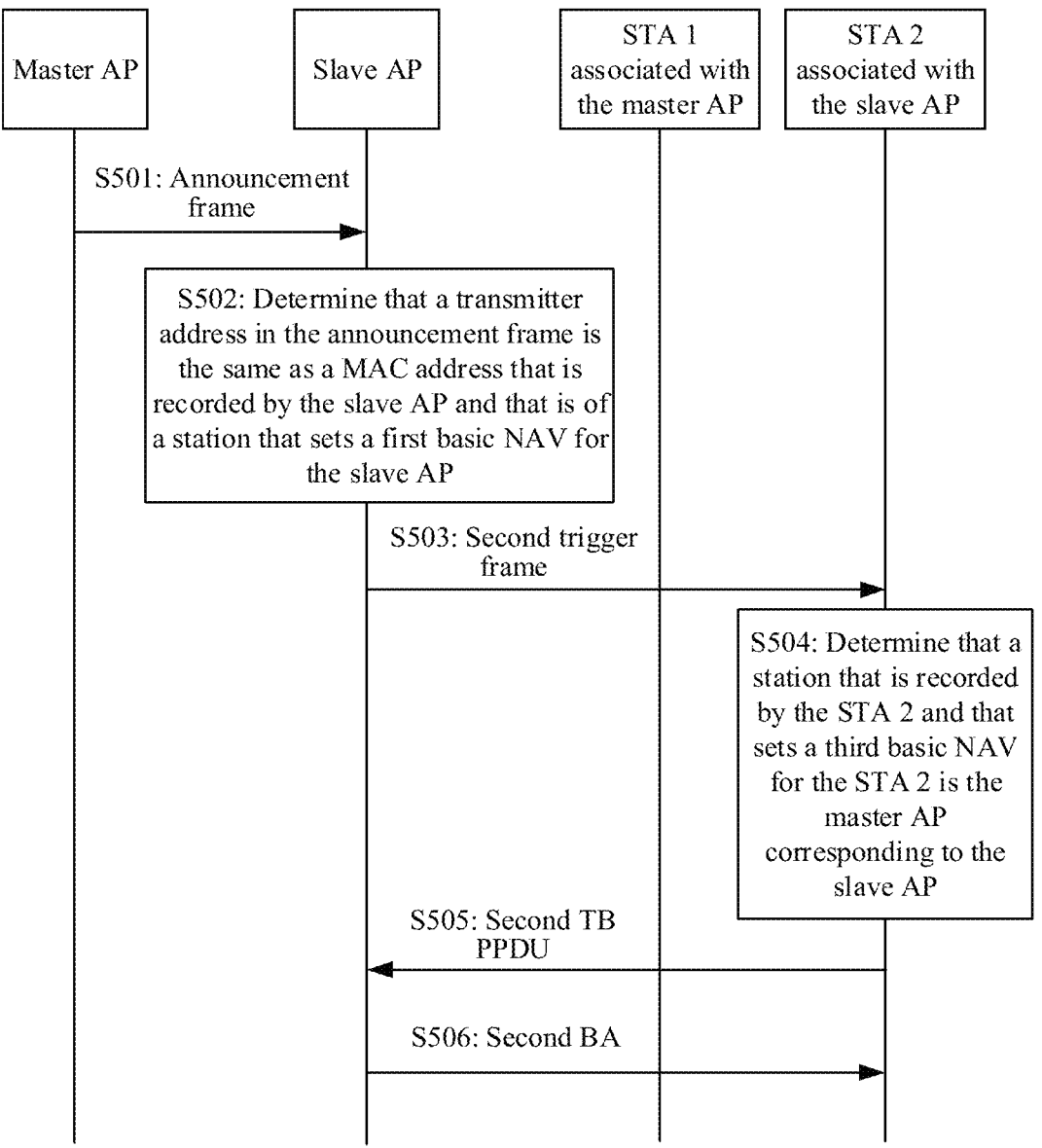
FIG. 5 is a flowchart of a cooperative communication method according to an embodiment of this application.

Communication between the master AP, any first STA (such as the STA 1) associated with the master AP, the slave AP, and any second STA (such as the STA 2) associated with the slave AP in the WLAN communications system shown in FIG. 2 is used as an example. FIG. 5 is a flowchart of a cooperative communication method according to an embodiment of this application. The cooperative communication method is implemented by introducing a rule for the slave AP and the STA 2 associated with the slave AP, and includes the following steps.

S501: The master AP sends an announcement frame to the slave AP. Correspondingly, the slave AP receives the announcement frame from the master AP. For the related descriptions of the duration field of the announcement frame, refer to a current technology, and details are not described herein again.

S502: The slave AP determines that a transmitter address in the announcement frame is the same as a MAC address that is recorded by the slave AP and that is of a station that sets a first basic NAV for the slave AP.

S503: The slave AP sends a second trigger frame (hereinafter referred to as trigger 2) to the STA 2 associated with the slave AP. Correspondingly, the STA 2 associated with the slave AP receives the trigger 2 from the slave AP.

In other words, a rule is introduced in this embodiment of this application as follows: If the slave AP determines that the transmitter address in the announcement frame (that is, a MAC address of the master AP) is the same as the MAC address that is recorded by the slave AP and that is of the station that sets the first basic NAV for the slave AP, the slave AP may send the trigger 2 to the STA 2 associated with the slave AP, regardless of whether the basic NAV in the slave AP has been reduced to 0. Optionally, the transmitter address in the announcement frame is not limited to the MAC address of the master AP, but may also be another address of the master AP, such as an AID of the master AP.

In this embodiment of this application, for the related descriptions of the duration field of the trigger 2, refer to the current technology, and details are not described herein again.

S504: After receiving the trigger 2, the STA 2 associated with the slave AP determines that a station that is recorded by the STA 2 and that sets a third basic NAV for the STA 2 is the master AP corresponding to the slave AP.

S505: The STA 2 associated with the slave AP sends a TB PPDU 2 to the slave AP. Correspondingly, the slave AP receives the TB PPDU 2 from the STA 2 associated with the slave AP.

In other words, a rule is introduced in this embodiment of this application as follows: If the STA 2 associated with the slave AP, after the reception of the trigger 2, determines that the station that is recorded by the STA 2 and that sets the third basic NAV for the STA 2 is the master AP corresponding to the slave AP, the STA 2 associated with the slave AP can send the TB PPDU 2 to the slave AP, regardless of whether the basic NAV of the STA 2 associated with the slave AP has been reduced to 0.

In this embodiment of this application, for the related descriptions of the duration field of the TB PPDU 2, refer to the current technology, and details are not described herein again.

In an embodiment, before the STA 2 associated with the slave AP receives the trigger 2, the cooperative communication method provided in this embodiment of this application further includes: the STA 2 associated with the slave AP receives the announcement frame, where the announcement frame is a previous radio frame of the trigger 2. Further, that the STA 2 associated with the slave AP determines that a station that is recorded by the STA 2 and that sets a third basic NAV for the STA 2 is the master AP corresponding to the slave AP may include: the STA 2 associated with the slave AP determines that the transmitter address in the announcement frame is the same as a MAC address that is recorded by the slave AP and that is of the station that sets the third basic NAV for the slave AP.

In other words, the STA 2 associated with the slave AP needs to record the MAC address of the station (such as the master AP) that sets the third basic NAV for the STA 2. When the STA 2 first receives an announcement frame (a receiver address in which is not necessarily the STA 2) sent by the station that sets the third basic NAV for the STA 2, and then immediately (usually after the SIFS time) receives the trigger 2 sent by an associated AP (such as a slave SP), if the trigger 2 triggers the STA 2 to respond, the STA 2 can respond directly, regardless of whether the third basic NAV is 0.

In another embodiment, the trigger 2 includes the MAC address of the master AP corresponding to the slave AP. Further, that the STA 2 associated with the slave AP determines that a station that is recorded by the STA 2 and that sets a third basic NAV for the STA 2 is the master AP corresponding to the slave AP may include: the STA 2 associated with the slave AP determines that the MAC address of the master AP carried in the trigger 2 is the same as a MAC address that is recorded by the slave AP and that is of the station that sets the third basic NAV for the slave AP.

In other words, the STA 2 associated with the slave AP needs to record the MAC address of the station (such as the master AP) that sets the third basic NAV for the STA 2. When the STA 2 receives the trigger 2 sent by an associated AP (such as a slave AP), if the trigger 2 triggers the STA 2 to respond, the STA 2 compares the MAC address of the master AP carried in the trigger 2 with the MAC address of the station that sets the third basic NAV for the STA 2. If the same, the STA 2 can respond directly, regardless of whether the third basic NAV is 0.

In still another embodiment, the trigger 2 includes a transmitter address field, and a value of the transmitter address field is set to the MAC address of the master AP corresponding to the slave AP. Further, that the STA 2 associated with the slave AP determines that a station that is recorded by the STA 2 and that sets a third basic NAV for the STA 2 is the master AP corresponding to the slave AP may include: the STA 2 associated with the slave AP determines that an address in the transmitter address field of the trigger 2 is the same as a MAC address that is recorded by the slave AP and that is of the station that sets the third basic NAV for the slave AP.

In other words, the STA 2 associated with the slave AP needs to record the MAC address of the station (such as the master AP) that sets the third basic NAV for the STA 2. When the STA 2 receives a trigger 2 in which a transmitter address is set to the master AP, if the trigger 2 triggers the STA 2 to respond, the STA 2 can respond directly, regardless of whether the third basic NAV is 0.

It should be noted that in this implementation, when receiving the trigger 2, the STA 2 needs to be able to accurately identify whether the triggered station is the STA 2. If identification is performed based on an association identifier (AID) (that is, a unique identifier of a station in a cell), an AID of the STA 2 should avoid being the same as an AID of an associated station (such as the STA 1 associated with the master AP) in a master BSS during an AID assigning process. If the AIDs are the same, a scheduled station cannot be uniquely determined. Certainly, if there is no cooperation between the master AP and the slave AP during AID assigning (that is, stations in two BSSs may has the same AID), another method needs to be used for station identification. For example, a BSS color is carried in the trigger 2, or a MAC address of the STA 2 may be directly used for scheduling. This is not limited in this embodiment of this application.

S506: After receiving the TB PPDU 2, the slave AP sends a second BA (herein referred to as BA 2) to the associated STA 2. Correspondingly, the STA 2 associated with the slave AP receives the BA 2 from the slave AP.

In this embodiment of this application, for the related descriptions of the duration field of the BA 2, refer to the current technology, and details are not described herein again.

Certainly, in this embodiment of this application, the master AP may also send the trigger 1 to the STA 1 associated with the master AP; after receiving the trigger 1, the STA 1 associated with the master AP may send the TB PPDU 1 to the master AP; and after receiving the TB PPDU 1, the master AP may send a first BA (hereinafter referred to as BA 1) to the associated STA 1. For a related implementation, refer to the current technology, and details are not described herein. Alternatively, this embodiment of this application is also applicable to a scenario in which the master AP temporarily transfers the usage right of a TXOP to the slave AP. After the announcement frame, only the slave AP sends the trigger 2, and the master AP does not send the trigger 1. A general description is provided herein, and details are not described below.

Based on the cooperative communication method provided in this embodiment of this application, a rule is introduced in this embodiment of this application as follows: If the slave AP determines that the transmitter address in the announcement frame is the same as the MAC address that is recorded by the slave AP and that is of the station that sets the first basic NAV for the slave AP, the slave AP sends the trigger 2 to the STA 2 associated with the slave AP; and if the STA 2 associated with the slave AP determines that the station that is recorded by the STA 2 and that sets the third basic NAV for the STA 2 is the master AP corresponding to the slave AP, the STA 2 associated with the slave AP can send the TB PPDU 2 to the slave AP. This resolves a failure in a cooperation procedure in the current technology due to a possible failure of the STA 2 associated with the slave AP in sending the TB PPDU 2 to the slave AP because the basic NAV in the STA 2 is currently not 0 when the STA 2 is triggered by the trigger 2 sent by the slave AP to respond.

The actions of the master AP, the slave AP, or the STA 2 associated with the slave AP in steps S501 to S506 described above may be performed by the processor 301 in the communications device 300 shown in FIG. 3 invoking application program code stored in the memory 303. This embodiment of this application does not impose any limitations on this.

Based on the cooperative communication method shown in FIG. 5, in an embodiment, in this embodiment of this application, after the slave AP is triggered by the announcement frame, if the slave AP finds that the announcement frame is sent by the master AP that sets the first basic NAV for the slave AP, the slave AP sets the first basic NAV to 0, and then sends the trigger 2 in response to the announcement frame. In other words, before the slave AP sends the trigger 2 to the STA 2 associated with the slave AP, the slave AP first sets its first basic NAV to 0, so that an existing basic NAV use rule does not need to be changed.

Similarly, based on the cooperative communication method shown in FIG. 5, in an embodiment, in this embodiment of this application, after the STA 2 associated with the slave AP is triggered by the trigger 2 sent by the slave AP, if the third basic NAV for the STA 2 is set by the master AP, the STA 2 sets the third basic NAV to 0, and then sends the TB PPDU 2 in response to the trigger 2 frame. In other words, before the STA 2 associated with the slave AP sends the TB PPDU 2 to the slave AP, the STA 2 associated with the slave AP first sets its third basic NAV to 0, so that an existing basic NAV use rule does not need to be changed.

Based on the cooperative communication method shown in FIG. 5, in another embodiment, in this embodiment of this application, after the slave AP is triggered by the announcement frame, if the slave AP finds that the announcement frame is sent by the master AP that sets the first basic NAV for the slave AP, the slave AP ignores the first basic NAV set by the master AP for the slave AP. Herein, ignoring the first basic NAV set by the master AP for the slave AP is different from directly setting the first basic NAV to 0, in that if the basic NAV for the slave AP has been set by a plurality of stations, the basic NAV set by another station for the slave AP is not necessarily 0 after the first basic NAV set by the master AP for the slave AP is ignored. If the slave AP determines that a value of a second basic NAV set by another station for the slave AP is 0 at this time, the slave AP can send the trigger 2 in response to the announcement frame; otherwise, the slave AP cannot send the trigger 2 in response to the announcement frame.

Similarly, based on the cooperative communication method shown in FIG. 5, in another embodiment, in this embodiment of this application, after the STA 2 associated with the slave AP is triggered by the trigger 2 sent by the slave AP, if the third basic NAV for the STA 2 is set by the master AP, the STA 2 ignores the third basic NAV set by the master AP for the STA 2. Herein, ignoring the third basic NAV set by the master AP for the STA 2 is different from directly setting the third basic NAV to 0, in that if the basic NAV for the STA 2 has been set by a plurality of stations, the basic NAV set by another station for the STA 2 is not necessarily 0 after the third basic NAV set by the master AP for the STA 2 is ignored. If the STA 2 determines that a value of a fourth basic NAV set by another station for the STA 2 is 0 at this time, the STA 2 can send the TB PPDU 2 in response to the trigger 2; otherwise, the STA 2 cannot send the TB PPDU 2 in response to the trigger 2.

Figure 6:
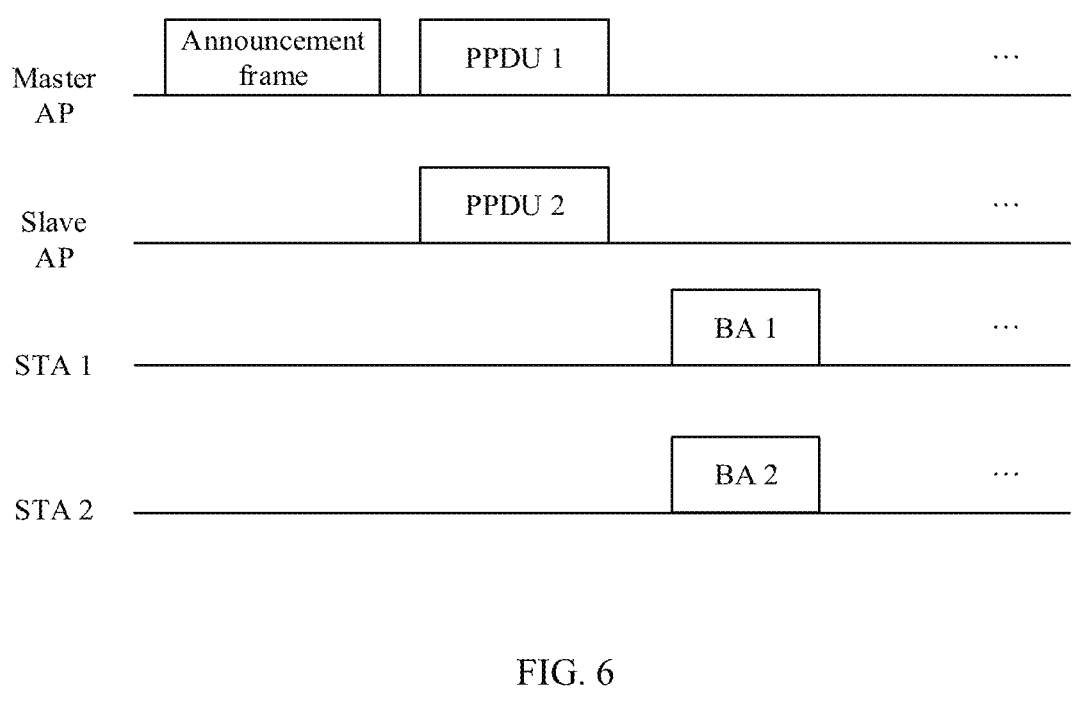

FIG. 6 is a diagram of an existing AP cooperation procedure for downlink data transmission. After accessing a channel through contention, a master AP sends an announcement frame to a slave AP. After the slave AP receives the announcement frame, the slave AP and the master AP each perform downlink data transmission. The master AP sends a PPDU 1 to a STA 1 associated with the master AP, and the slave AP sends a PPDU 2 to an associated STA 2. Transmission of the PPDU 1 and transmission of the PPDU 2 end simultaneously. After an SIFS subsequent to the end of the transmission of the PPDU 1 and the PPDU 2, the STA 1 sends a BA 1 to the master AP, and the STA 2 sends a BA 2 to the slave AP. In some cases, for example, in a case of transmission of a single aggregated media access control protocol data unit (A-MPDU), the BA 1 herein may also be an ACK 1, and the BA 2 herein may also be an ACK 2, which is not limited herein.

It is assumed in the foregoing AP cooperation procedure for downlink data transmission that the slave AP can send the PPDU 2 after the reception of the announcement frame. If a first basic NAV is set for the slave AP by the announcement frame (for example, a receiver address (RA) of the announcement frame is set to a broadcast address), or a first basic NAV is set for the slave AP by a radio frame from the master AP earlier than the announcement frame, a value of the first basic NAV is not 0, and the slave AP may not be able to send the PPDU 2. It is very common that there is another radio frame before the announcement frame. For example, after the master AP accesses a channel through contention, the master AP first exchanges an RTS/CTS frame with the STA 1 associated with the master AP, for channel protection. For another example, the master AP first collaborates with another slave AP, and then collaborates with the aforementioned slave AP in the same TXOP.

Based on this, the cooperative communication method provided in this embodiment of this application may further include: after the slave AP receives the announcement frame from the master AP, if the slave AP determines that the transmitter address in the announcement frame (that is, the MAC address of the master AP) is the same as the MAC address that is recorded by the slave AP and that is of the station that sets the first basic NAV for the slave AP, sending, by the slave AP, the PPDU 2 to the STA 2 associated with the slave AP. In other words, a rule is introduced in this embodiment of this application as follows: If the slave AP determines that the transmitter address in the announcement frame is the same as the MAC address that is recorded by the slave AP and that is of the station that sets the first basic NAV for the slave AP, the slave AP sends the PPDU 2 to the STA 2 associated with the slave AP. This resolves a possible failure in a current technology of the slave AP in sending the PPDU 2 because the value of the first basic NAV in the slave AP is not 0 after the slave AP receives the announcement frame.

In the foregoing AP cooperation procedure for downlink data transmission, in an embodiment, after the slave AP is triggered by the announcement frame, if the slave AP finds that the announcement frame is sent by the master AP that sets the first basic NAV for the slave AP, the slave AP sets the first basic NAV to 0, and then sends the PPDU 2 in response to the announcement frame. In other words, before the slave AP sends the PPDU 2 to the STA 2 associated with the slave AP, the slave AP first sets its first basic NAV to 0, so that an existing basic NAV use rule does not need to be changed.

Similarly, based on the cooperative communication method shown in FIG. 5, in an embodiment, in this embodiment of this application, after the STA 2 associated with the slave AP is triggered by the trigger 2 sent by the slave AP, if the third basic NAV for the STA 2 is set by the master AP, the STA 2 sets the third basic NAV to 0, and then sends the TB PPDU 2 in response to the trigger 2 frame. In other words, before the STA 2 associated with the slave AP sends the TB PPDU 2 to the slave AP, the STA 2 associated with the slave AP first sets its third basic NAV to 0, so that an existing basic NAV use rule does not need to be changed.

In the foregoing AP cooperation procedure for downlink data transmission, in another embodiment, after the slave AP is triggered by the announcement frame, if the slave AP finds that the announcement frame is sent by the master AP that sets the first basic NAV for the slave AP, the slave AP ignores the first basic NAV set by the master AP for the slave AP. Herein, ignoring the first basic NAV set by the master AP for the slave AP is different from directly setting the first basic NAV to 0, in that if the basic NAV for the slave AP has been set by a plurality of stations, the basic NAV set by another station for the slave AP is not necessarily 0 after the first basic NAV set by the master AP for the slave AP is ignored. If the slave AP determines that a value of a second basic NAV set by another station for the slave AP is 0 at this time, the slave AP can send the PPDU 2 in response to the announcement frame; otherwise, the slave AP cannot send the PPDU 2 in response to the announcement frame.

Figure 7:
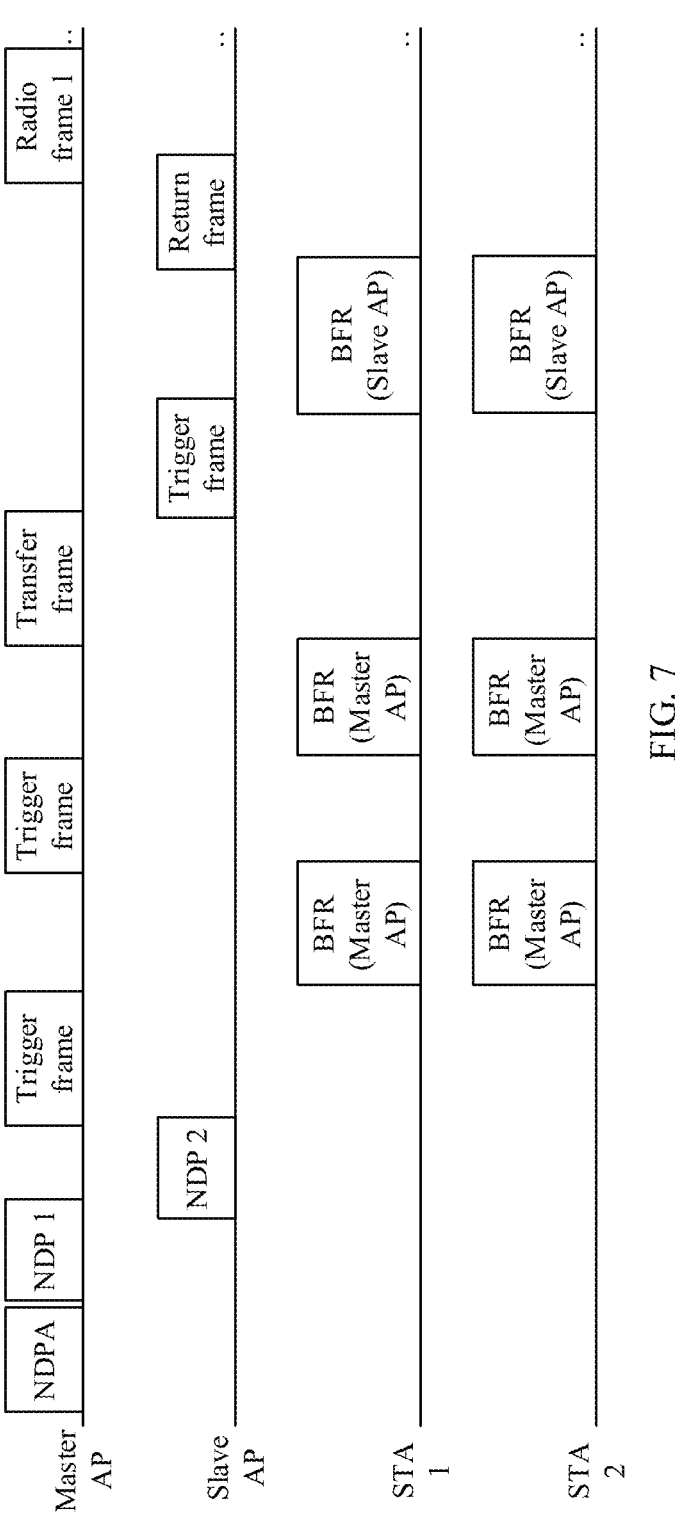
FIG. 7 is a diagram of a multi-AP channel measurement procedure according to an embodiment of this application.

In some scenarios, the master AP needs to temporarily transfer the usage right of a TXOP to the slave AP. In this case, a station associated with the slave AP or a station associated with the master AP may not be able to respond to the scheduling by the slave AP. For example, FIG. 7 shows a multi-AP channel measurement procedure. In the multi-AP channel measurement procedure, a master AP first sends a null data packet announcement (NDPA) frame, and sends a null data packet (NDP) 1 frame after an SIFS interval subsequent to the end of the transmission of the NDPA frame. The NDPA frame is used to schedule a slave AP corresponding to the master AP to send an NDP 2 frame after an SIFS time interval subsequent to the end of the transmission of the NDP 1. Further, a STA 1 associated with the master AP measures channel information between the STA 1 and the master AP by using the NDP 1 frame, and the STA 1 measures channel information between the STA 1 and the slave AP by using the NDP 2 frame; and a STA 2 associated with the slave AP measures channel information between the STA 2 and the master AP by using the NDP 1 frame, and the STA 2 measures channel information between the STA 2 and the slave AP by using the NDP 2 frame. After the SIFS time interval subsequent to the end of the transmission of the NDP 2 frame, the master AP sends a trigger frame, to trigger the STA 1 and the STA 2 to feed back the channel information between each of them and the master AP to the master AP. As shown in FIG. 7, the STA 1 and the STA 2 each send a beamforming report (BFR) (denoted as BFR (master AP)) to the master AP. Certainly, if the feedback of all the channel information cannot be completed with one trigger, or if an error occurs in the feedback process, the master AP may send a trigger frame again to trigger the STA 1 and the STA 2 to continue the feedback. After the STA 1 and the STA 2 have fed back all the channel information between them and the master AP, the master AP temporarily transfers the usage right of the TXOP to the slave AP by using a transfer frame, and the slave AP sends a trigger frame to trigger the STA 1 and the STA 2 to feed back channel information between each of them and the slave AP to the slave AP. As shown in FIG. 7, the STA 1 and the STA 2 each send a BFR (denoted as BFR (slave AP)) to the slave AP. After completing the transmission, the slave AP may return the usage right of the TXOP to the master AP. For example, as shown in FIG. 7, the slave AP may return the usage right of the TXOP to the master AP by using a return frame. Further, the master AP can continue to send a subsequent radio frame 1. The radio frame 1 may be, for example, a control frame sent to the slave AP, or may be, for example, a downlink data PPDU sent to a STA associated with the master AP, or may be, for example, a trigger frame to trigger a STA associated with the master AP to perform uplink data transmission, which is not limited herein. It should be noted that the BFR in FIG. 7 is only an example of a response frame for the trigger frame. Certainly, the response frame for the trigger frame may also be another radio frame, which is not limited herein.

However, after the master AP temporarily transfers the usage right of the TXOP to the slave AP, when the slave AP sends the trigger frame to trigger the STA 1 and the STA 2 to feed back the channel information between each of them and the slave AP to the slave AP, neither of the STA 1 and the STA 2 may be able to respond to the trigger frame sent by the slave AP because an intra-BSS NAV is set by the associated master AP for the STA 1 and a basic NAV is set by the master AP for the STA 2. In addition, after the slave AP returns the usage right of the TXOP to the master AP, the STA 1 may not be able to respond to the scheduling by the master AP because a basic NAV may be set by the slave AP for the STA 1 after the extension of the TXOP.

Figure 8:
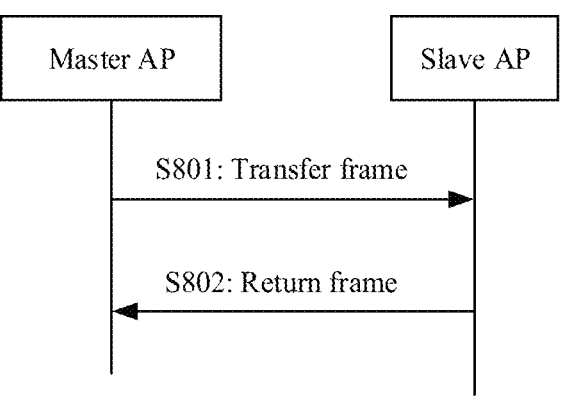
FIG. 8 is a flowchart of a cooperative communication method according to an embodiment of this application.

Communication between the master AP and the slave AP in the WLAN communications system described in FIG. 2 is used as an example. FIG. 8 is a flowchart of a cooperative communication method according to an embodiment of this application. The method includes the following steps.

S801: The master AP sends a transfer frame to the slave AP. Correspondingly, the slave AP receives the transfer frame from the master AP.

The transfer frame includes a duration field, a value of the duration field is set to a second duration, an end time of the second duration is not later than an end time of a trigger frame or is not later than a start time of a next radio frame of the trigger frame.

In addition, the transfer frame may further carry a remaining TXOP field, and the remaining TXOP field is used to indicate a remaining time the TXOP is allowed to use. As such, after receiving the transfer frame, the slave AP can extend the TXOP itself, but the extended TXOP cannot exceed an end time point indicated by the remaining TXOP. It should be noted herein that, to prevent the long continual use of a channel by a station from causing other stations to be unable to access, a TXOP limit is specified in the standard to identify a maximum time allowed for a single TXOP time period. Herein, a value of the remaining TXOP field is limited by the TXOP limit. The end time point indicated by the remaining TXOP cannot exceed an end time point indicated by the TXOP limit. A general description is provided herein, and details are not described below.

In this embodiment of this application, when the master AP sends a transfer frame to the slave AP, a STA 1 associated with the master AP and a STA 2 associated with the slave AP may also receive the transfer frame, so that an intra-BSS NAV may be set for the STA 1, and a basic NAV may be set for the STA 2. Values of the intra-BSS NAV and the basic NAV are both equal to the value of the second duration.

S802: The slave AP sends a return frame to the master AP. Correspondingly, the master AP receives the return frame from the slave AP.

The return frame includes a duration field, a value of the duration field is set to a third duration, and an end time of the third duration is not later than an end time of the first radio frame (that is, the radio frame 1 in FIG. 7) sent by the master AP after the return frame plus an SIFS time.

It should be noted that in this embodiment of this application, before step S802, there may also be some radio frame exchange procedures. As shown in FIG. 7, the slave AP sends a trigger frame to trigger each of the STA 1 and the STA 2 to send a BFR (denoted as BFR (slave AP)) to the slave AP. This is not limited in this embodiment of this application. In addition, there may also be some radio frame exchange procedures before step S801 and after step S802. For details, refer to FIG. 7, which is not described herein again.

It should be noted that, in this embodiment of this application, no limitation is imposed on how the master AP transfers the usage right of the TXOP to the slave AP, and no limitation is imposed on structures of the transfer frame and the return frame. This embodiment of this application is explained by using the procedure in FIG. 7 as an example, but is not limited to the procedure of multi-AP cooperation channel measurement. The solution in this embodiment of this application can be used in all procedures in which the master AP needs to temporarily transfer the usage right of the TXOP to the slave AP, and then the slave AP performs transmission independently.

The value of the duration field of the transfer frame is set to the second duration, and the end time of the second duration is not later than the end time of the trigger frame or is not later than the start time of the next radio frame of the trigger frame. Therefore, when the slave AP sends the trigger frame to trigger the STA 1 and the STA 2 to feed back the channel information between each of them and the slave AP to the slave AP, before the STA 1 feeds back the channel information between the STA 1 and the slave AP to the slave AP, the intra-BSS NAV set in the STA 1 has been reduced to 0, and then the STA 1 can successfully send a next radio frame (such as BFR (slave AP) in FIG. 7) to the slave AP under the assumption that physical carrier sensing for the STA 1 is idle and a basic NAV for the STA 1 is 0. In addition, before the STA 2 feeds back the channel information between the STA 2 and the slave AP to the slave AP, the basic NAV set in the STA 2 has been reduced to 0, and then the STA 2 can successfully send a next radio frame (such as BFR (slave AP) in FIG. 7) to the associated slave AP under the assumption that physical carrier sensing for the STA 2 is idle. In addition, the return frame includes the duration field, the value of the duration field is set to the third duration, and the end time of the third duration is not later than the end time of the first radio frame sent by the master AP after the return frame plus the SIFS time. In other words, when the first radio frame sent by the master AP after the return frame is a trigger frame, the basic NAV set by the slave AP for the STA 1 may be 0 before a TB PPDU is returned. This can resolve the problem that when the master AP schedules its associated STA 1, the STA 1 may not be able to respond to the scheduling by the master AP because the basic NAV may be set by the slave AP for the STA 1 after the extension of the TXOP.

The actions of the master AP or the slave AP in steps S801 and S802 described above may be performed by the processor 301 in the communications device 300 shown in FIG. 3 invoking application program code stored in the memory 303. This embodiment of this application does not impose any limitations on this.

In the foregoing embodiment, gradual extension of the TXOP duration is used, in which how the master AP sets the duration field of the transfer frame is discussed. However, it is not taken into consideration how to set a duration value of another radio frame prior to the transfer frame if the master AP has already sent the another radio frame before the transfer frame. If the TXOP duration has already been set to be very long for the radio frame prior to the transfer frame, that is, an end time of the TXOP duration exceeds the start time of the next radio frame of the trigger frame, because the TXOP length cannot be shortened (unless CF-END is used to release the channel), even if the value of the duration field of the transfer frame is set to the aforementioned second duration, the STA 2 associated with the slave AP does not update the basic NAV based on the transfer frame because the basic NAV longer than the second duration indicated in the transfer frame has been set for the STA 2. As a result, after the STA 2 associated with the slave AP is triggered by the trigger frame, the STA 2 cannot return the next radio frame because the value of the basic NAV is not 0.

To resolve this problem, in an embodiment of this application, when the master AP sets the duration of the duration field of another radio frame prior to the transfer frame, the end time of the duration of the duration field set by the master AP cannot exceed the start time of the next radio frame of the trigger frame after the master AP temporarily transfers the usage right of the TXOP to the slave AP. In other words, during setting of a NAV for a radio frame prior to the transfer frame, it is required to consider NAV setting restrictions for the transfer frame.

Generally, channel reservation is required before data transmission. For example, RTS/CTS (for a single station) or multi-user (MU)-RTS/CTS (for multiple stations) exchange is used. It is very inefficient that an RTS/CTS can be used only for interaction with a single STA. The embodiments of this application relate to communication between multiple APs and multiple STAs in multiple BSSs, and therefore it is more suitable to use an MU-RTS/CTS.

Figure 9:
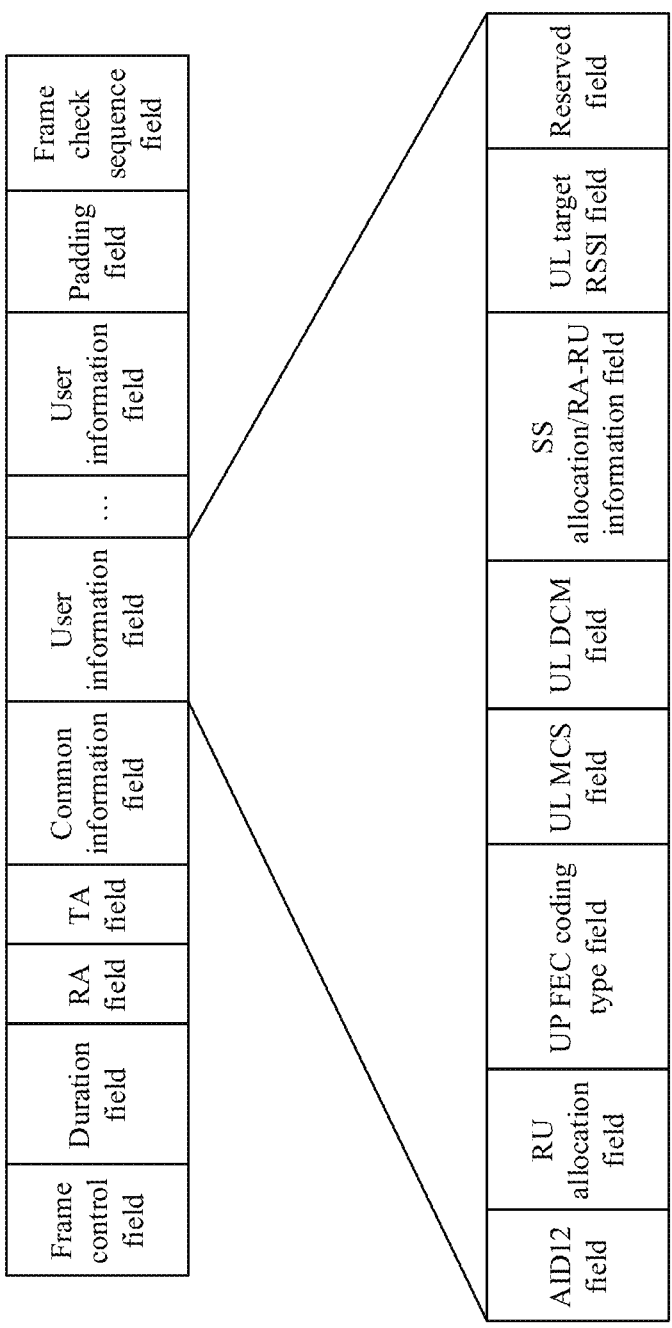
FIG. 9 is a diagram of an existing MU-RTS frame.

FIG. 9 shows an existing MU-RTS frame structure, including a frame control field, a duration field, an RA field, a TA field, one or more common information fields (two common information fields are exemplarily drawn in FIG. 9), a user information field, . . . , a padding field, and a frame check sequence field. The user information field includes an AID12 field, an RU allocation field, an uplink forward error correction (FEC) coding type (UL FEC coding type) field, an uplink MCS (UL MCS) field, an uplink dual carrier modulation (DCM) (UL DCM) field, a spatial stream (SS) allocation/random access resource unit (RA-RU) information (SS allocation/RA-RU information) field, an uplink target received signal strength indication (RSSI) (UL target RSSI) field, and a reserved field. Currently, the UL MCS field, the UL FEC coding type field, the UL DCM field, the SS allocation/RA-RU information field, and the UL target RSSI field are also reserved fields. For a description of each field, refer to related descriptions of the existing MU-RTS frame structure. Details are not described herein.

However, the current MU-RTS/CTS cannot support inter-BSS interaction. If multiple APs interact with their respective associated STAs, there is also a problem, because after a master AP and its associated STA perform MU-RTS/CTS exchange, basic NAVs are set for both a slave AP and its associated STA, and the slave AP and its associated STA cannot return CTS frames. Therefore, how to perform channel protection through MU-RTS/CTS exchange in a multi-AP cooperation scenario is a problem to be solved urgently.

Figure 10:
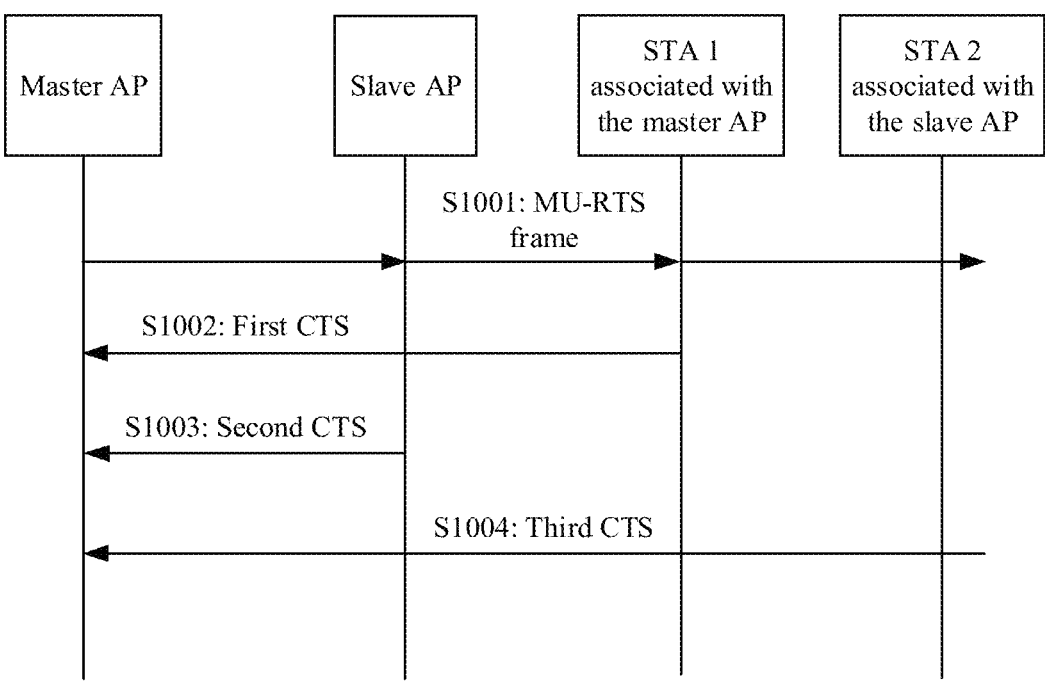
FIG. 10 is a flowchart of a cooperative communication method according to an embodiment of this application.

Communication between the master AP, any first STA (such as the STA 1) associated with the master AP, the slave AP, and any second STA (such as the STA 2) associated with the slave AP in the WLAN communications system shown in FIG. 2 is used as an example. FIG. 10 is a flowchart of a cooperative communication method according to an embodiment of this application. The method includes the following steps.

S1001: The master AP sends an MU-RTS frame. A value of a transmitter address field of the MU-RTS frame is set to a MAC address of the master AP, and a value of a receiver address field of the MU-RTS frame is set to a broadcast address.

As shown in FIG. 10, in this embodiment of this application, the MU-RTS frame sent by the master AP may be received by the STA 1 associated with the master AP, the slave AP, the slave AP, and the STA 2 associated with the slave AP.

In an embodiment, the master AP assigns a unique AID to each of the STA associated with the master AP, the slave AP corresponding to the master AP, and the STA associated with the slave AP. In addition, the master AP assigns a user information field to each of the STA associated with the master AP, the slave AP, and the STA associated with the slave AP. The user information field includes an AID12 field. A value of the AID12 field is set to correspond to the 12 least significant bits of the AID of the STA associated with the master AP, the 12 least significant bits of the AID of the slave AP, or the 12 least significant bits of the AID of the STA associated with the slave AP. In other words, the MU-RTS frame in step S1001 includes the user information field of the STA 1 associated with the master AP, the user information field of the slave AP, and the user information field of the STA 2 associated with the slave AP. The user information field of the STA 1 associated with the master AP includes a first AID12 field. A value of the first AID12 field is set to the 12 least significant bits of the AID of the STA 1 associated with the master AP. The user information field of the slave AP includes a second AID12 field. A value of the second AID12 field is set to the 12 least significant bits of the AID of the slave AP. The user information field of the STA 2 associated with the slave AP includes a third AID12 field. A value of the third AID12 field is set to the 12 least significant bits of the AID of the STA 2 associated with the slave AP. The AIDs assigned by the master AP to the STA 1 associated with the master AP, the slave AP, and the STA 2 associated with the slave AP are different from each other.

Certainly, the user information field of the STA associated with the master AP, the user information field of the slave AP corresponding to the master AP, and the user information field of the STA associated with the slave AP each may further include the RU allocation field, the UL FEC coding type field, the UL MCS field, the UL DCM field, the SS allocation/RA-RU information field, the UL target RSSI field, and the reserved field that are shown in FIG. 9. This is not limited in this embodiment of this application.

Optionally, in this implementation, when the master AP assigns the AID to the STA associated with the slave AP, the master AP may first notify the AID of the STA associated with the slave AP to the slave AP, and then the slave AP forwards the AID to the STA associated with the slave AP. Alternatively, the master AP may pre-allocate a segment of AID space to the slave AP, and the slave AP selects and assigns an AID in the AID space to each STA associated with the slave AP. Alternatively, the master AP directly assigns an AID to the STA associated with the slave AP through exchange. This is not limited in this embodiment of this application.

The AID of the STA associated with the master AP, the AID of the slave AP corresponding to the master AP, and the AID of the STA associated with the slave AP are assigned by the master AP and are unique. Therefore, the STA associated with the master AP, the slave AP, and the station associated with the slave AP that are scheduled can all return a CTS frame according to the scheduling (for example, perform the following steps S1002 to S1004). In this way, channel protection is achieved through MU-RTS/CTS exchange in the multi-AP cooperation scenario.

In another embodiment, the existing AID assigning mechanism may not be changed, that is, the AID of the STA associated with the master AP and the AID of the slave AP corresponding to the master AP are assigned by the master AP, and the AID of the STA associated with the slave AP is assigned by the slave AP. In other words, an AID of a STA in a master BSS and an AID of a STA in a slave BSS are no longer unique. In addition, the master AP assigns a user information field to each of the STA associated with the master AP, the slave AP, and the STA associated with the slave AP. The user information field includes an AID12 field. A value of the AID12 field is set to correspond to the 12 least significant bits of the AID of the STA associated with the master AP, the 12 least significant bits of the AID of the slave AP, or the 12 least significant bits of the AID of the STA associated with the slave AP. In addition, the user information field further includes a specified field, which is used to indicate a BSS color of a BSS associated with a corresponding station. For the STA associated with the master AP, a BSS color of the station is set to a BSS color of a master BSS. For STAs associated with the slave AP, BSS colors of the STAs are set to BSS colors of their associated BSSs, and for the slave AP, a BSS color of the slave AP is set to a BSS color of a slave BSS. In other words, the MU-RTS frame in step S1001 includes the user information field of the STA 1 associated with the master AP, the user information field of the slave AP, and the user information field of the STA 2 associated with the slave AP. The user information field of the STA 1 associated with the master AP includes a first AID12 field and a first specified field. A value of the first AID12 field is set to the 12 least significant bits of the AID of the STA 1 associated with the master AP. The first specified field is used to indicate a first BSS color, and the first BSS color is a BSS color of the master BSS associated with the STA 1. The user information field of the slave AP includes a second AID12 field and a second specified field. A value of the second AID12 field is set to the 12 least significant bits of the AID of the slave AP. The second specified field is used to indicate a second BSS color, and the second BSS color is a BSS color of the slave BSS associated with the slave AP. The user information field of the STA 2 associated with the slave AP includes a third AID12 field and a third specified field. A value of the third AID12 field is set to the 12 least significant bits of the AID of the STA 2 associated with the slave AP. The third specified field is used to indicate a third BSS color, and the third BSS color is a BSS color of the slave BSS associated with STA 2.

In an example, because the UL MCS field, the UL FEC coding type field, the UL DCM field, the SS allocation/RA-RU information field, and the UL target RSSI field in the user information field shown in FIG. 9 are reserved fields, in this embodiment of this application, the foregoing specified field (including the first specified field, the second specified field, or the third specified field) may be some fields in the UL MCS field, the UL FEC coding type field, the UL DCM field, the SS allocation/RA-RU information field, and the UL target RSSI field. In other words, some fields in the UL MCS field, the UL FEC coding type field, the UL DCM field, the SS allocation/RA-RU information field, and the UL target RSSI field may be used to indicate a corresponding BSS color. For example, the corresponding BSS color may be indicated by 6 bits in the SS allocation/RA-RU information field in the user information field; alternatively, the corresponding BSS color may be indicated by 1 bit in the UL FEC coding type field, 4 bits in the UL MCS field, and 1 bit in the UL DCM field in the user information field.

Optionally, in this implementation, the user information field may further use an auxiliary indication, so that a receiving station is clear that the user information field carries the BSS color or not. For example, 1 bit in the UL MCS field, the UL FEC coding type field, the UL DCM field, the SS allocation/RA-RU information field, and the UL target RSSI field in the user information field may be used to indicate whether the corresponding BSS color is carried. Setting this bit to 0 indicates that the corresponding BSS color is not carried, and setting this bit to 1 indicates that the corresponding BSS color is carried.

Optionally, in this implementation, another trigger type may be used to indicate that an inter-BSS MU-RTS is currently being sent. The trigger type is a subfield of the common information field in FIG. 9 to distinguish a type of a trigger frame. Details are not described herein.

By means of the specified field and the AID12 field in the user information field, the STA associated with the master AP, the slave AP, and the station associated with the slave AP that are scheduled can all return a CTS frame according to the scheduling (for example, perform the following steps S1002 to S1004). In this way, channel protection is achieved through MU-RTS/CTS exchange in the multi-AP cooperation scenario.

S1002: The STA 1 associated with the master AP receives the MU-RTS frame from the master AP, and sends a first CTS frame to the master AP based on the scheduling by the MU-RTS frame. Correspondingly, the master AP receives the first CTS frame from the STA 1 associated with the master AP.

In this embodiment of this application, that the STA 1 associated with the master AP sends a first CTS frame to the master AP based on the scheduling by the MU-RTS frame includes: the STA 1 associated with the master AP may learn from the user information field of the STA 1 in the MU-RTS frame that the MU-RTS frame is used to schedule the STA 1, and then the STA 1 may send the first CTS frame to the master AP when it is determined that the basic NAV is 0 and the physical carrier sensing result is idle.

S1003: The slave AP receives the MU-RTS frame from the master AP, and sends a second CTS frame to the master AP based on the scheduling by the MU-RTS frame. Correspondingly, the master AP receives the second CTS frame from the slave AP.

In this embodiment of this application, that the slave AP sends a second CTS frame to the master AP based on the scheduling by the MU-RTS frame includes: the slave AP may learn from the user information field of the slave AP in the MU-RTS frame that the MU-RTS frame is used to schedule the slave AP, and the slave AP determines that a MAC address that is recorded by the slave AP and that is of a station that sets the basic NAV for the slave AP is the same as a transmitter address in the MU-RTS frame, and then the slave AP sends the second CTS frame to the master AP when it is determined that the intra-BSS NAV is 0 and the physical carrier sensing result is idle. In other words, a rule is introduced in this embodiment of this application: The transmitter address in the MU-RTS frame is the MAC address of the master AP, and the MAC address that is recorded by the slave AP and that is of the station that sets the basic NAV for the slave AP is the MAC address of the master AP. If the slave AP determines that the intra-BSS NAV is 0 and the physical carrier sensing result is idle, the slave AP sends the second CTS frame to the master AP, regardless of whether the basic NAV in the slave AP is 0.

S1004: The STA 2 associated with the slave AP receives the MU-RTS frame from the master AP, and sends a third CTS frame to the master AP based on the scheduling by the MU-RTS frame. Correspondingly, the master AP receives the third CTS frame from the STA 2 associated with the slave AP.

It should be noted that in the foregoing procedure, all the steps S1002 to S1004 are not required to occur. When at least one of steps S1002 to S1004 occurs, the master AP can confirm that the MU-RTS/CTS exchange is successful. In addition, the MU-RTS sent by the master AP in step S1001 may alternatively carry at least one of the user information field of the STA associated with the master AP, the user information field of the slave AP, and the user information field of the STA associated with the slave AP. For example, in practical applications, when the master AP needs to protect a channel with the slave AP, the MU-RTS sent by the AP may carry only the user information field of the slave AP.

In this embodiment of this application, that the STA 2 associated with the slave AP sends a third CTS frame to the master AP based on the scheduling by the MU-RTS frame includes: the STA 2 associated with the slave AP may learn from the user information field of the STA 2 in the MU-RTS frame that the MU-RTS frame is used to schedule the STA 2, and the STA 2 determines that a MAC address that is recorded by the STA 2 and that is of a station that sets the basic NAV for the STA 2 is the same as a transmitter address in the MU-RTS frame, and then the STA 2 sends the third CTS frame to the master AP when it is determined that the intra-BSS NAV is 0 and the physical carrier sensing result is idle. In other words, a rule is introduced in this embodiment of this application: The transmitter address in the MU-RTS frame is the MAC address of the master AP, and the MAC address that is recorded by the STA 2 associated with the slave AP and that is of the station that sets the basic NAV for the STA 2 is the MAC address of the master AP. If the STA 2 determines that the intra-BSS NAV is 0 and the physical carrier sensing result is idle, the STA 2 sends the third CTS frame to the master AP, regardless of whether the basic NAV in the STA 2 is 0.

The actions of the master AP, the STA 1 associated with the master AP, the slave AP, or the STA 2 associated with the slave AP in steps S1001 to S1004 described above may be performed by the processor 301 in the communications device 300 shown in FIG. 3 invoking application program code stored in the memory 303. This embodiment of this application does not impose any limitations on this.

It should be noted that the foregoing embodiments of this application are all described by using an example in which the STA associated with the slave AP has two NAVs. When the STA associated with the slave AP has only one NAV, a NAV may also be set by the announcement frame from the master AP for the STA associated with the slave AP, and the STA cannot return a trigger frame. The problem is the same. The cooperative communication methods provided in the foregoing embodiments of this application can also resolve this problem. In other words, the cooperative communication methods provided in the embodiments of this application are also applicable when the STA associated with the slave AP supports only one NAV. A general description is provided herein, and details are not described below.

It can be understood that, in the foregoing embodiments, the methods and/or steps implemented by the master AP may also be implemented by a component that can be used for the master AP; the methods and/or steps implemented by the slave AP may also be implemented by a component that can be used for the slave AP; the methods and/or steps implemented by the second station associated with the slave AP may also be implemented by a component that can be used for the second station associated with the slave AP.

The solutions provided in the embodiments of this application are mainly described from the perspective of interaction between network elements. Correspondingly, the embodiments of this application further provide a communications apparatus. The communications apparatus may be the master AP in the foregoing method embodiments, or an apparatus including the foregoing master AP, or a component that can be used for the master AP. Alternatively, the communications apparatus may be the slave AP in the foregoing method embodiments, or an apparatus including the foregoing slave AP, or a component that can be used for the slave AP. Alternatively, the communications apparatus may be the second station associated with the slave AP in the foregoing method embodiments, or an apparatus including the second station associated with the slave AP, or a component that can be used for the second station associated with the slave AP. It can be understood that, to implement the foregoing functions, the communications apparatus includes a corresponding hardware structure and/or software module for performing the functions. A person skilled in the art should easily be aware that in combination with the examples described in the embodiments disclosed in this specification, units and algorithms steps may be implemented by hardware or a combination of hardware and computer software in this application. Whether a function is performed by hardware or hardware driven by computer software depends on particular applications and design constraints of the technical solutions. A skilled person may use different methods to implement the described functions for each particular application, but it should not be considered that the implementation goes beyond the scope of this application.

Figure 11:
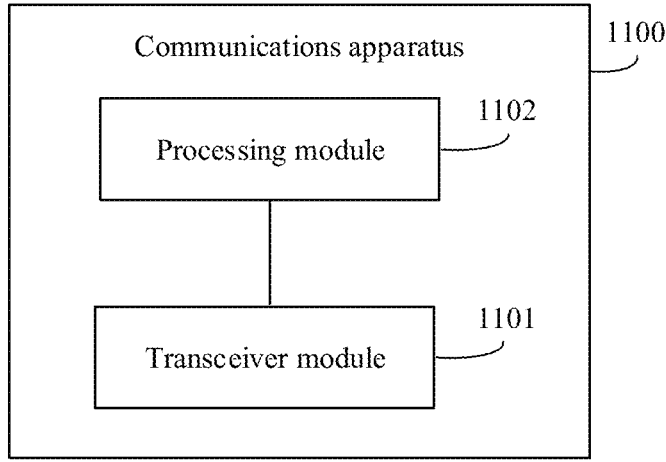
FIG. 11 is a diagram of a slave AP according to an embodiment of this application.

For example, the communications apparatus is the slave AP or a chip in the slave AP in the foregoing method embodiments. FIG. 11 is a diagram of a communications apparatus 1100. The communications apparatus 1100 may be configured to implement any function of the slave AP in the foregoing embodiments. The communications apparatus 1100 includes a transceiver module 1101 and a processing module 1102. The transceiver module 1101 may also be referred to as a transceiver unit, and is configured to implement a transceiver function. For example, the transceiver module 1101 may be a transceiver circuit, a transceiver, a transceiver, or a communications interface.

In an embodiment, the transceiver module 1101 is configured to receive an announcement frame from a master access point, where the announcement frame includes a duration field, a value of the duration field is set to a first duration, an end time of the first duration is not later than an end time of a target trigger frame or is not later than a start time of a target TB PPDU, the target trigger frame is a next radio frame of the announcement frame, and the target TB PPDU is a response frame for the target trigger frame, where the target trigger frame includes a second trigger frame, and the target TB PPDU includes a second TB PPDU; the processing module 1102 is configured to generate the second trigger frame; the transceiver module 1101 is further configured to send the second trigger frame to a second station associated with the slave access point; and the transceiver module 1101 is further configured to receive the second TB PPDU from the second station.

Optionally, the processing module 1102 is further configured to: before the transceiver module 1101 sends the second trigger frame to the second station, determine that a transmitter address in the announcement frame is the same as a MAC address that is recorded by the communications apparatus 1100 and that is of a station that sets a basic NAV for the slave access point.

In another embodiment, the transceiver module 1101 is configured to receive the announcement frame from the master access point; the processing module 1102 is configured to determine that the transmitter address in the announcement frame is the same as a MAC address that is recorded by the slave access point and that is of a station that sets a first basic NAV for the slave access point; and the transceiver module 1101 is further configured to send a next radio frame to the second station associated with the slave access point.

Optionally, the transceiver module 1101 is further configured to receive a second TB PPDU from the second station.

Optionally, the processing module 1102 is further configured to set the first basic NAV to 0 before the transceiver module 1101 sends the second trigger frame to the second station.

Optionally, the transceiver module 1101 is further configured to: before the transceiver module 1101 sends the second trigger frame to the second station, ignore the first basic NAV and then determine that a value of the second basic NAV in the slave access point is 0.

For function descriptions of the corresponding functional modules, refer to all related content of the steps in the foregoing method embodiments. Details are not described herein again.

In this embodiment, the communications apparatus 1100 is presented in a form of functional modules obtained through division in an integrated manner. The "module" herein may be an ASIC, a circuit, a processor that executes one or more software or firmware programs, a memory, an integrated logic circuit, and/or another component that can provide the foregoing functions. In a simple embodiment, a person skilled in the art may figure out that the communications apparatus 1100 may be in the form of the communications device 300 shown in FIG. 3.

For example, the processor 301 in the communications device 300 shown in FIG. 3 may invoke the computer execution instructions stored in the memory 303, to enable the communications device 300 to perform the cooperative communication method in the foregoing method embodiments.

The functions/implementation processes of the transceiver module 1101 and the processing module 1102 in FIG. 11 may be implemented by the processor 301 in the communications device 300 shown in FIG. 3 by invoking the computer-executable instructions stored in the memory 303. Alternatively, a function/an implementation process of the processing module 1102 in FIG. 11 may be implemented by the processor 301 in the communications device 300 shown in FIG. 3 by invoking the computer-executable instructions stored in the memory 303, and a function/an implementation process of the transceiver module 1101 in FIG. 11 may be implemented through the communications interface 304 in the communications device 300 shown in FIG. 3.

The communications apparatus 1100 provided in this embodiment may perform the foregoing cooperative communication methods. Therefore, for technical effects that can be obtained by the communications apparatus, refer to the foregoing method embodiments. Details are not described herein again.

Figure 12:
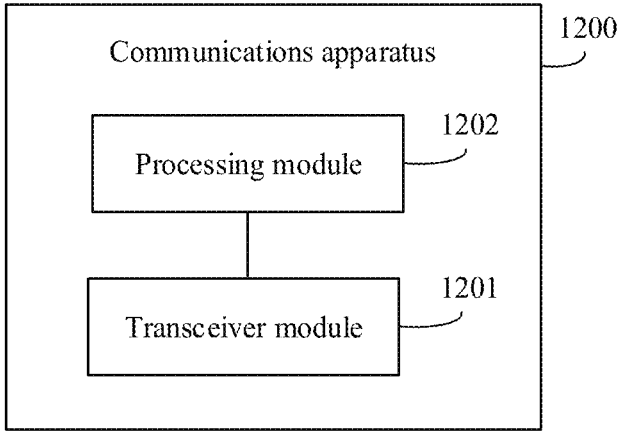
FIG. 12 is a diagram of a master AP according to an embodiment of this application.

FIG. 12 is a diagram of a communications apparatus 1200. The communications apparatus 1200 may be the master AP or a chip in the master AP in the foregoing method embodiments, and can implement the methods and functions related to the master AP in the foregoing embodiments. The communications apparatus 1200 includes a transceiver module 1201 and a processing module 1202. The transceiver module 1201 may also be referred to as a transceiver unit, and is configured to implement a transceiver function. For example, the transceiver module 1201 may be a transceiver circuit, a transceiver, a transceiver, or a communications interface.

The processing module 1202 is configured to generate an announcement frame, where the announcement frame includes a duration field, a value of the duration field is set to a first duration, an end time of the first duration is not later than an end time of a target trigger frame or is not later than a start time of a target TB PPDU, the target trigger frame is a next radio frame of the announcement frame, and the target TB PPDU is a next radio frame of the target trigger frame, where the target trigger frame includes a first trigger frame, and the target TB PPDU includes a first TB PPDU; the transceiver module 1201 is configured to send the announcement frame; the processing module 1202 is further configured to generate the first trigger frame; the transceiver module 1201 is further configured to send the first trigger frame to a first station associated with the master access point; and the transceiver module 1201 is further configured to receive the first TB PPDU from the first station.

For function descriptions of the corresponding functional modules, refer to all related content of the steps in the foregoing method embodiments. Details are not described herein again.

In this embodiment, the communications apparatus 1200 is presented in a form of functional modules obtained through division in an integrated manner. The "module" herein may be an ASIC, a circuit, a processor that executes one or more software or firmware programs, a memory, an integrated logic circuit, and/or another component that can provide the foregoing functions. In a simple embodiment, a person skilled in the art may figure out that the communications apparatus 1200 may be in the form of the communications device 300 shown in FIG. 3.

For example, the processor 301 in the communications device 300 shown in FIG. 3 may invoke the computer execution instructions stored in the memory 303, to enable the communications device 300 to perform the communication method in the foregoing method embodiments.

The functions/implementation processes of the transceiver module 1201 and the processing module 1202 in FIG. 12 may be implemented by the processor 301 in the communications device 300 shown in FIG. 3 by invoking the computer-executable instructions stored in the memory 303. Alternatively, a function/an implementation process of the processing module 1202 in FIG. 12 may be implemented by the processor 301 in the communications device 300 shown in FIG. 3 by invoking the computer-executable instructions stored in the memory 303, and a function/an implementation process of the transceiver module 1201 in FIG. 12 may be implemented through the communications interface 304 in the communications device 300 shown in FIG. 3.

The communications apparatus 1200 provided in this embodiment may perform the foregoing communication methods. Therefore, for technical effects that can be obtained by the communications apparatus, refer to the foregoing method embodiments. Details are not described herein again.

Figure 13:
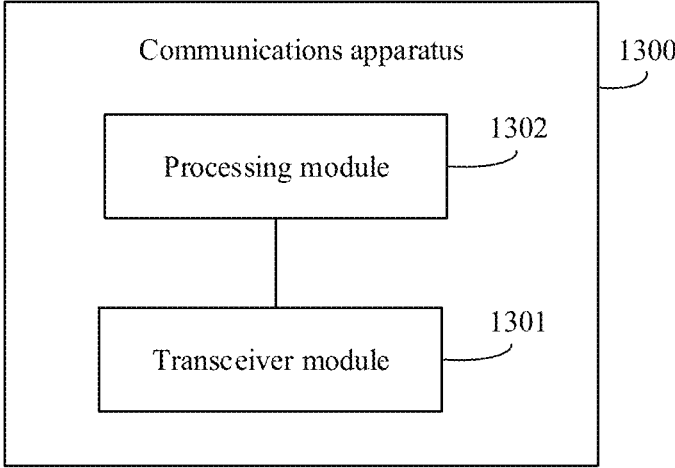
FIG. 13 is a diagram of a second STA associated with a slave AP according to an embodiment of this application.

FIG. 13 is a diagram of a communications apparatus 1300. The communications apparatus 1300 may be a second station associated with a slave AP and a chip in the second station, to implement the methods and functions of the second station in the foregoing method embodiments. The communications apparatus 1300 includes a transceiver module 1301 and a processing module 1302. The transceiver module 1301 may also be referred to as a transceiver unit, and is configured to implement a transceiver function. For example, the transceiver module 1301 may be a transceiver circuit, a transceiver, a transceiver, or a communications interface.

The transceiver module 1301 is configured to receive a second trigger frame from the slave access point; the processing module 1302 is configured to determine that a station that is recorded by the communications apparatus 1300 and that sets a third basic NAV for the communications apparatus 1300 is a master access point corresponding to the slave access point; and the transceiver module 1301 is further configured to send a second TB PPDU to the slave access point.

Optionally, the transceiver module 1301 is further configured to receive an announcement frame, where the announcement frame is a previous radio frame of the second trigger frame; and the processing module 1302 being further configured to determine that a station that is recorded by the communications apparatus 1300 and that sets a third basic NAV for the communications apparatus 1300 is a master access point associated with the slave access point includes: the processing module 1302 is further configured to determine that a transmitter address in the announcement frame is the same as a MAC address that is recorded by the slave access point and that is of the station that sets the third basic NAV for the slave access point.

Optionally, the second trigger frame includes a MAC address of the master access point corresponding to the slave access point; and the processing module 1302 being configured to determine that a station that is recorded by the communications apparatus 1300 and that sets a third basic NAV for the communications apparatus 1300 is a master access point associated with the slave access point includes: the processing module 1302 is configured to determine that the MAC address of the master access point is the same as a MAC address that is recorded by the slave access point and that is of the station that sets the third basic NAV for the slave access point.

Optionally, the second trigger frame includes a transmitter address field, and a value of the transmitter address field is set to a MAC address of the master access point corresponding to the slave access point; and the processing module 1302 being configured to determine that a station that is recorded by the communications apparatus 1300 and that sets a third basic NAV for the communications apparatus 1300 is a master access point associated with the slave access point includes: the processing module 1302 is configured to determine that a transmitter address in the second trigger frame is the same as a MAC address that is recorded by the slave access point and that is of the station that sets the third basic NAV for the slave access point.

Optionally, the processing module 1302 is further configured to set the third basic NAV to 0 before the transceiver module 1301 sends the second TB PPDU to the slave access point.

Optionally, the processing module 1302 is further configured to: before the transceiver module 1301 sends the second TB PPDU to the slave access point, ignore the third basic NAV and then determine that a value of a fourth basic NAV in the communications apparatus 1300 is 0.

For function descriptions of the corresponding functional modules, refer to all related content of the steps in the foregoing method embodiments. Details are not described herein again.

In this embodiment, the communications apparatus 1300 associated with the slave AP is presented in a form of functional modules obtained through division in an integrated manner. The "module" herein may be an ASIC, a circuit, a processor that executes one or more software or firmware programs, a memory, an integrated logic circuit, and/or another component that can provide the foregoing functions. In a simple embodiment, a person skilled in the art may FIG. out that the communications apparatus 1300 associated with the slave AP may be in the form of the communications device 300 shown in FIG. 3.

For example, the processor 301 in the communications device 300 shown in FIG. 3 may invoke the computer execution instructions stored in the memory 303, to enable the communications device 300 to perform the communication method in the foregoing method embodiments.

The functions/implementation processes of the transceiver module 1301 and the processing module 1302 in FIG. 13 may be implemented by the processor 301 in the communications device 300 shown in FIG. 3 by invoking the computer-executable instructions stored in the memory 303. Alternatively, a function/an implementation process of the processing module 1302 in FIG. 13 may be implemented by the processor 301 in the communications device 300 shown in FIG. 3 by invoking the computer-executable instructions stored in the memory 303, and a function/an implementation process of the transceiver module 1301 in FIG. 13 may be implemented through the communications interface 304 in the communications device 300 shown in FIG. 3.

The communications apparatus 1300 provided in this embodiment may perform the foregoing communication method. Therefore, for technical effects that can be achieved by the communications apparatus, refer to the foregoing method embodiments. Details are not described herein.

It should be noted that one or more of the foregoing modules or units may be implemented by using software, hardware, or a combination thereof. When any one of the foregoing modules or units is implemented by using software, the software exists in a form of computer program instructions, and is stored in a memory. The processor may be configured to execute the program instructions to implement the foregoing method procedures. The processor may be integrated into an SoC (system on chip) or an ASIC, or may be an independent semiconductor chip. In addition to a core configured to perform an operation or processing by executing software instructions, the processor may further include a necessary hardware accelerator, for example, a field programmable gate array (FPGA), a PLD (programmable logic device), or a logic circuit that implements a dedicated logic operation.

When the foregoing modules or units are implemented by using hardware, the hardware may be any one of or any combination of a CPU, a microprocessor, a digital signal processing (DSP) chip, a microcontroller unit (MCU), an artificial intelligence processor, an ASIC, an SoC, an FPGA, a PLD, a dedicated digital circuit, a hardware accelerator, or a non-integrated discrete device. The hardware may perform the foregoing method procedures with necessary software or without software.

Optionally, an embodiment of this application further provides a communications apparatus (for example, the communications apparatus may be a chip or a chip system). The communications apparatus includes a processor, configured to implement the method in any one of the foregoing method embodiments. In an embodiment, the communications apparatus further includes a memory. The memory is configured to store necessary program instructions and data. The processor may invoke program code stored in the memory, to instruct the communications apparatus to perform the method in any one of the foregoing method embodiments. Certainly, the memory may not be in the communications apparatus. When the communications apparatus is the chip system, the communications apparatus may include a chip, or may include a chip and another discrete component. This is not limited in this embodiment of this application.

In the descriptions of this application, "/" represents an "or" relationship between associated objects unless otherwise specified. For example, AB may represent A or B. The term "and/or" in this application is merely an association relationship for describing associated objects, and represents that three relationships may exist. For example, A and/or B may represent the following three cases: Only A exists, both A and B exist, and only B exists, where A and B each may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" are not intended to limit a quantity or an execution sequence, and the terms such as "first" and "second" do not indicate a definite difference. In addition, in the embodiments of this application, words such as "example" or "for example" are used to represent giving an example, an illustration, or a description. Any embodiment or design scheme described as an "example" or "for example" in the embodiments of this application should not be explained as being more preferred or having more advantages than another embodiment or design scheme. The use of the word such as "example" or "for example" is intended to present a related concept in a specific manner for ease of understanding.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a good effect.

Although this application is described with reference to features and the embodiments thereof, it is clear that, various modifications and combinations may be made to them without departing from the spirit and scope of this application. Correspondingly, the specification and accompanying drawings are merely example descriptions of this application defined by the accompanying claims, and are considered as any of or all modifications, variations, combinations or equivalents that cover the scope of this application. Definitely, a person skilled in the art can make various modifications and variations to this application without departing from the spirit and scope of this application. This application is intended to cover these modifications and variations of this application provided that the modifications and variations fall within the scope defined by the following claims and their equivalent technologies.

What is claimed is:

1. A cooperative communication method, the method comprising:

receiving, by a slave access point, an announcement frame, the announcement frame comprises a duration field, wherein a value of the duration field is set to a first duration, the first duration is less than or equal to a length of transmission time of a next radio frame after the announcement+a length of time of a short inter-frame space (SIFS);

determining, by the slave access point, a basic network allocation vector (NAV) based on the announcement frame.

2. The method according to claim 1, the method further comprising:

ignoring, by the slave access point, the basic NAV, if a transmitter address in the announcement frame is the same as a media access control (MAC) address that is recorded by the slave access point and that is of a station that sets a basic NAV.

3. The method according to claim 1, the method further comprising:

setting, by the slave access point, the basic NAV to 0, if a transmitter address in the announcement frame is the same as a media access control (MAC) address that is recorded by the slave access point and that is of a station that sets a basic NAV.

4. The method according to claim 1, the method further comprising:

determining, by the salve access point, whether a transmitter address in the announcement frame is the same as a media access control (MAC) address that is recorded by the slave access point and that is of a station that sets a basic NAV.

5. The method according to claim 1, wherein a value of a duration field of the next radio frame is determined according to a preset rule.

6. The method according to claim 5, wherein the announcement frame comprises a preset time field, and the preset time field is used to determine the value of the duration field of the next radio frame.

7. The method according to claim 1, wherein the next radio is a response frame sent by the slave access point.

8. The method according to claim 1, wherein a start time of the first duration is an end time of the announcement frame.

9. The method according to claim 1, wherein the first duration is less than or equal to the length of transmission time of the next radio frame after the announcement+a length of time of an SIFS, comprising:

the first duration is less than or equal to a length of time of an SIFS+the length of transmission time of the next radio frame after the announcement+a length of time of an SIFS.

10. A communications apparatus, the communications apparatus comprising:

a processing module; and a transceiver in communication with the processing module, the processing module is configured to:

receive an announcement frame from a master access point, the announcement frame comprises a duration field, wherein a value of the duration field is set to a first duration, the first duration is less than or equal to a length of transmission time of a next radio frame after the announcement+a length of time of a short inter-frame space (SIFS);

determine a basic network allocation vector (NAV) based on the announcement frame.

11. The apparatus according to claim 10, the apparatus further comprising:

ignoring the basic NAV, if a transmitter address in the announcement frame is the same as a media access control (MAC) address that is recorded by the apparatus and that is of a station that sets a basic NAV.

12. The apparatus according to claim 10, the apparatus further comprising:

setting the basic NAV to 0, if a transmitter address in the announcement frame is the same as a media access control (MAC) address that is recorded by the apparatus and that is of a station that sets a basic NAV.

13. The apparatus according to claim 10, the apparatus further comprising:

determining whether a transmitter address in the announcement frame is the same as a media access control (MAC) address that is recorded by the apparatus and that is of a station that sets a basic NAV.

14. The apparatus according to claim 10, wherein a value of a duration field of the next radio frame is determined according to a preset rule.

15. The apparatus according to claim 14, wherein the announcement frame comprises a preset time field, and the preset time field is used to determine the value of the duration field of the next radio frame.

16. The apparatus according to claim 10, wherein the next radio is a response frame sent by the slave access point.

17. The apparatus according to claim 10, wherein a start time of the first duration is an end time of the announcement frame.

18. The apparatus according to claim 10, wherein the first duration is less than or equal to the length of transmission time of the next radio frame after the announcement+a length of time of an SIFS, comprising:

the first duration is less than or equal to a length of time of an SIFS+the length of transmission time of the next radio frame after the announcement+a length of time of an SIFS.

19. A chip, comprising:

a processing module; and a transceiver in communication with the processing module, the processing module is configured to:

receive an announcement frame from a master access point, the announcement frame comprises a duration field, wherein a value of the duration field is set to a first duration, the first duration is less than or equal to a length of transmission time of a next radio frame after the announcement+a length of time of a short inter-frame space (SIFS);

determine a basic network allocation vector (NAV) based on the announcement frame.

20. The chip according to claim 19, wherein the first duration is less than or equal to the length of transmission time of the next radio frame after the announcement+a length of time of an SIFS, comprising:

the first duration is less than or equal to a length of time of an SIFS+the length of transmission time of the next radio frame after the announcement+a length of time of an SIFS.

* * * * *